United States Patent [19]

Verrando et al.

[11] Patent Number: 4,605,425
[45] Date of Patent: Aug. 12, 1986

[54] HEATERLESS DRYER HAVING VARIABLE CYCLE

[75] Inventors: Marcel G. Verrando, Ocala; Michael B. Duich, Bellview; Bradley T. Overton, Ocala, all of Fla.

[73] Assignee: Pall Corporation, East Hills, N.Y.

[21] Appl. No.: 731,563

[22] Filed: May 6, 1985

[51] Int. Cl.$^4$ .................................... B01D 53/04
[52] U.S. Cl. ...................................... 55/20; 55/33;
55/62; 55/74; 55/162; 55/163; 55/179; 55/275;
55/387
[58] Field of Search ................ 55/20, 33, 35, 58, 62,
55/68, 74, 75, 161–163, 179, 180, 208, 274, 275,
387, 389

[56] References Cited

U.S. PATENT DOCUMENTS

| | | | |
|---|---|---|---|
| 1,892,428 | 12/1932 | Fonda | 55/20 X |
| 2,703,628 | 3/1955 | Pompeo et al. | 55/161 |
| 2,944,627 | 7/1960 | Skarstrom | 55/25 |
| 3,448,561 | 6/1969 | Seibert et al. | 55/33 |
| 3,513,631 | 5/1970 | Seibert et al. | 55/62 |
| 4,023,940 | 5/1977 | Shultz | 55/163 |
| 4,101,298 | 7/1978 | Myers et al. | 55/163 |
| 4,127,395 | 11/1978 | McKey et al. | 55/20 |
| 4,168,149 | 9/1979 | Armond et al. | 55/21 |
| 4,197,095 | 4/1980 | White, Jr. et al. | 55/20 |
| 4,205,967 | 6/1980 | Sandman et al. | 55/21 |
| 4,247,311 | 1/1981 | Seibert et al. | 55/162 |
| 4,275,448 | 6/1981 | Le Dall | 364/500 |
| 4,295,863 | 10/1981 | Lattuada | 55/21 |
| 4,299,595 | 10/1981 | Benkmann et al. | 55/21 |
| 4,322,223 | 3/1982 | Christel, Jr. | 55/18 |
| 4,349,357 | 9/1982 | Russell | 55/21 |
| 4,351,649 | 9/1982 | Owens et al. | 55/162 |
| 4,404,005 | 9/1983 | Hamlin et al. | 55/163 |
| 4,472,177 | 9/1984 | Sircar | 55/163 X |
| 4,546,442 | 10/1985 | Tinker | 364/500 |
| 4,552,570 | 11/1985 | Gravatt | 55/33 X |

FOREIGN PATENT DOCUMENTS

| | | |
|---|---|---|
| 84/02086 | 6/1984 | PCT Int'l Appl. |
| 633137 | 12/1949 | United Kingdom . |
| 677150 | 8/1952 | United Kingdom . |
| 929178 | 5/1982 | U.S.S.R. ................ 55/20 |

OTHER PUBLICATIONS

"The Pall Century Series Dryers", brochure No. PPC C-101, Pall Pneumatic Products Corporation, Ocala, Fla. (Mar. 1984) 20 pages.
"New Micro Computer Control for Amloc-DHA Dryer", brochure No. PPS-1002, Pall Pneumatic Products Corporation, Ocala, Fla. (Feb. 1983) 4 pages.
"New AMLOC-CHA Dryer Models 1600–6400", Pall Pneumatic Products Corporation, Ocala, Fla. (Jun. 1983) 8 pages.

Primary Examiner—Robert Spitzer
Attorney, Agent, or Firm—Leydig, Voit & Mayer, Ltd.

[57] ABSTRACT

A method and apparatus for fractionating a mixture of gasses, by using a bed of sorbent which is conditionally depressurized and purged after adsorption intervals of a predetermined time duration, varies the time duration in response to demand as indicated by the decisions of whether purging is required. Preferably a historical record is kept of the recent purge decisions, and based upon this historical record, the duration of the adsorption interval is increased at a limited rate up to a maximum duration when purging is infrequently required, and is decreased at a limited rate down to a minimum duration when purging is frequently required. The method and apparatus is particularly suited to drying air or other gasses using a heaterless pressure-swing dehydrator of the kind having two alternately-switched desiccant beds, and capacitance probes inserted in the middle of each bed for sensing the advance of the moisture fronts to determine whether purge is required at the end of the respective adsorption interval.

32 Claims, 25 Drawing Figures

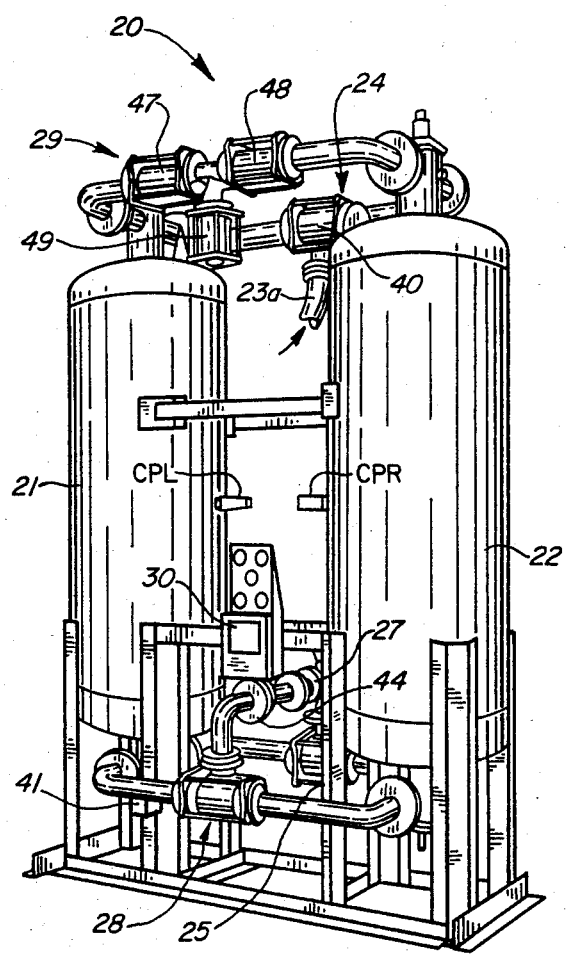
FIG. 1
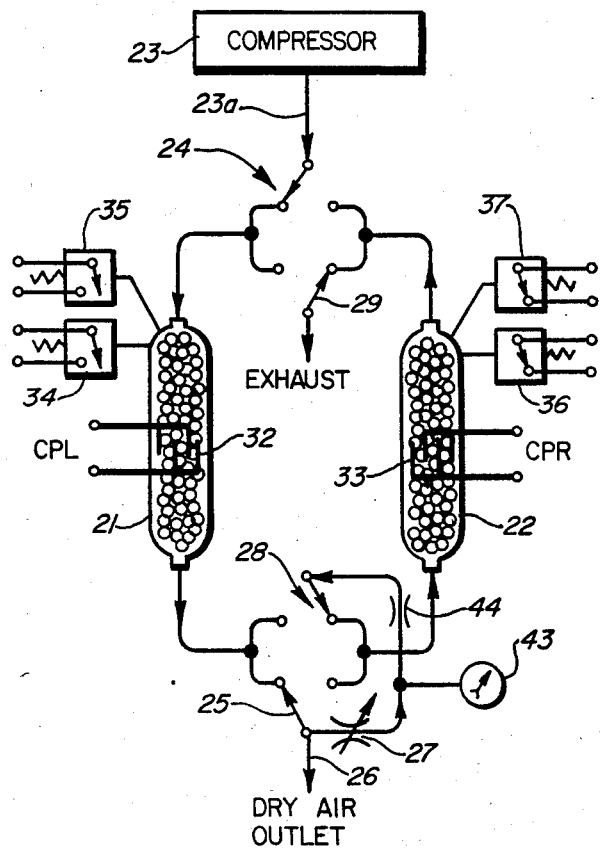
FIG. 2
FIG. 5
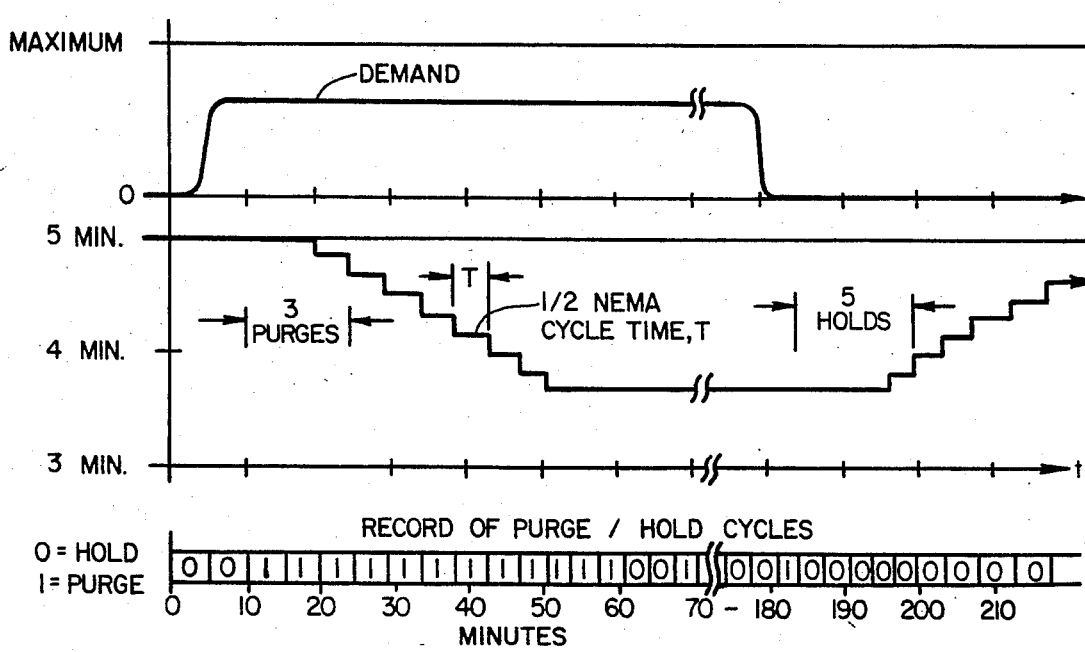

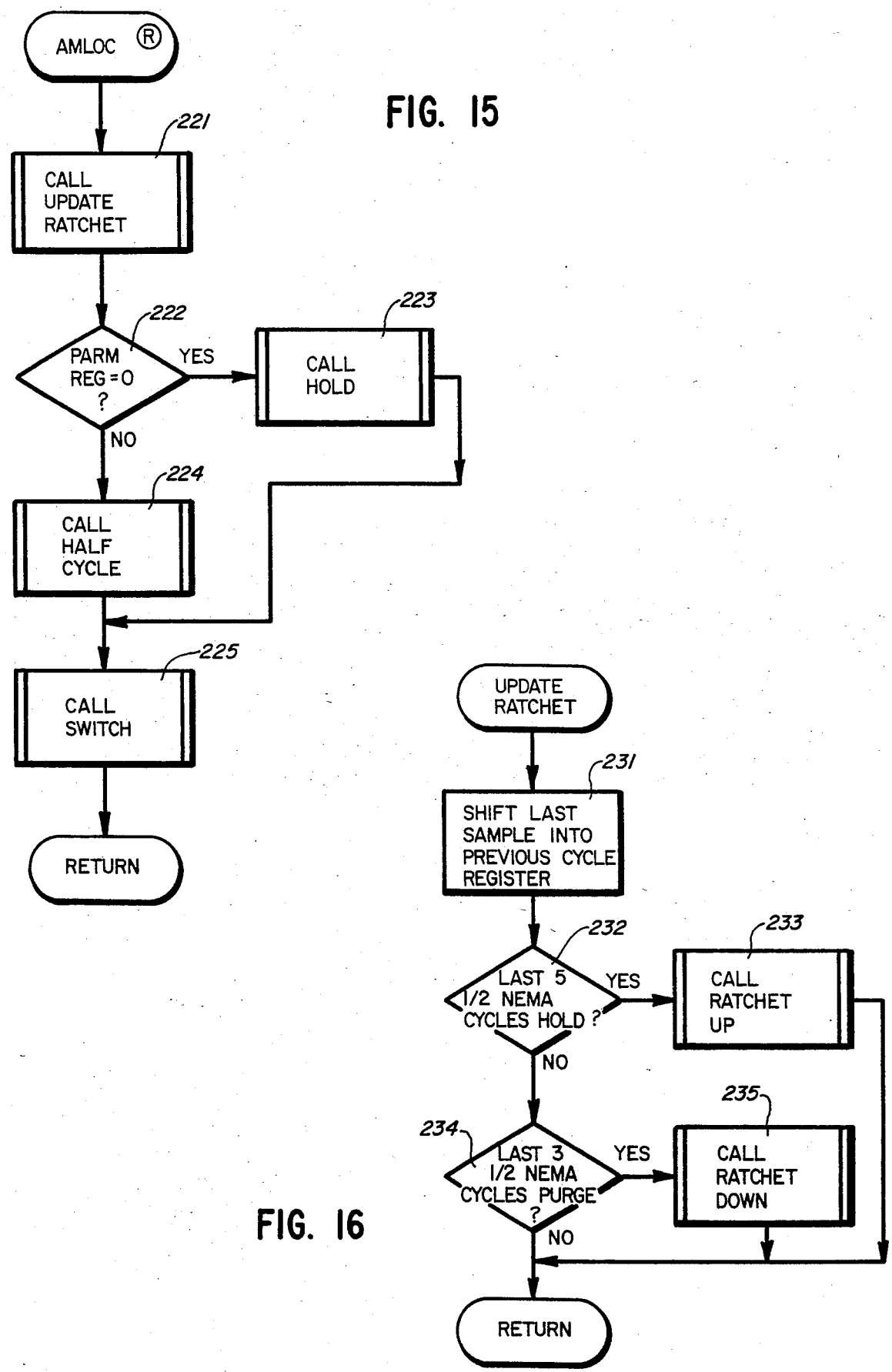

HEATERLESS DRYER HAVING VARIABLE CYCLE

BACKGROUND OF THE INVENTION

1. Technical Field

This invention relates generally to the field of gas dryers. In particular, this invention relates to a desiccant gas dryer of the kind having a pair of sorbent or desiccant beds, wherein one bed is regenerated as the other bed adsorbs vapor.

2. Description of the Related Art

The desirability of drying air after compression is well known. A variety of systems have been developed over the years for this purpose, many of which employ two beds containing an adsorbent or desiccant material such as activated alumina. In such systems the beds alternately dry the process stream and then are regenerated either using an auxiliary source of heat in so-called heat-reactivated systems, or through conservation and use of the heat of adsorption for effecting regeneration, in so-called heaterless pressure-swing systems. In heat-reactivated systems, it has been common to use fixed cycles several hours in length, such that a bed is on adsorption for a period of time, perhaps eight hours, after which it is regenerated during the eight hour adsorption cycle for the other bed. In the heaterless systems relatively short, fixed cycle times are used, typically about four minutes for drying with four minutes allowed for regeneration while the other bed is drying the process stream.

Typically both heat-reactivated and heaterless systems are sized for maximum contemplated loading conditions, conditions which may seldom or never be encountered during actual operation. As a result, at the end of a fixed drying cycle a bed may have adsorbed only a fraction of its moisture capacity. In the case of heat-reactivated dryers, such underutilization of the bed while on adsorption coupled with a full energy regeneration can seriously affect overall operating efficiency.

Similarly, off-peak operation of heaterless dryers on fixed cycles can result in low operation efficiencies. By their nature heaterless dryers employ approximately 15% of the dry product air for regeneration purposes such that unnecessarily purging a partially loaded bed for the full regeneration period is highly inefficient.

Over the years "demand" rather than fixed cycling has been employed in both heat-reactivated and heaterless dryers. Seibert, et al. U.S. Pat. No. 3,448,561 discloses a system for sensing the actual moisture content of the on-stream bed and terminating the adsorption cycle when regeneration is complete. Alternatively, the patent suggests that the moisture content of the regenerated bed can be monitored, and the purge flow can be terminated when the moisture content of the bed has dropped below a predetermined minimum. That patent discloses the use of a lithium chloride humidity sensor external to the desiccant beds with gas sampling conduit leading from the beds to the cell. This method, however, was not found to be commercially successful for demand control of heaterless dryers, due to the relatively short cycle times in these heaterless systems.

A brute-force technique for demand control of heaterless dryers is disclosed by White, Jr. et al. U.S. Pat. No. 4,197,095. White, Jr. et al. teach that the flow rate, inlet and outlet temperatures, inlet and outlet pressures, and regenerating pressures could be sensed, and all the sensed information should be fed to a microprocessor programmed to calculate the quantity of purge and the purge flow rate, and based on these calculations, control the regeneration and cycling time. Such a control method, however, has had limited commercial application due to the relatively high cost of reliable sensors and their associated electronics.

To date, considerable success has been achieved in sensing the moisture loading on a desiccant bed by placing a capacitor directly into the bed with the sorbent or desiccant between the capacitor plates. As the moisture loading varies, the dielectric constant of the sorbent changes, such that the capacitance provides an electrical indication of the moisture loading. The use of such a capacitor probe for the control of a heaterless dryer is disclosed in Gravatt U.S. Pat. No. 4,552,570 issued Nov. 12, 1985. The capacitor probes are placed in the middle of the desiccant beds, and a "fixed-variable" control method is used in which the adsorption and cycle times are fixed but in which the off-stream bed is conditionally purged and regenerated based upon whether, at the end of each adsorption interval, the capacitor in the respective bed having undergone adsorption indicates that regeneration is required. This "fixed-variable" control method tends to equalize loading on the beds by preventing the capacity of the heavier-loaded bed from being reduced in the event of a sudden increase in loading.

A microcomputer-based control system for a desiccant dryer employing the "fixed-variable" control method is described in Tinker U.S. Pat. No. 4,546,422 issued Oct. 8, 1985 which is herein incorporated by reference.

SUMMARY OF THE INVENTION

The primary object of the invention is to extend the operating range of a heaterless adsorbent fractionator to accommodate extreme loading conditions.

Another object of the invention is to permit a smaller, more economical heaterless dryer to be specified based upon a customer's peak loading conditions.

Yet another object of the invention is to operate a heaterless dryer more efficiently under low loading conditions.

A specific object of the invention is to provide a method of varying the cycle time of a heaterless dryer in response to demand while maintaining relatively equal loading on the sorbent beds.

Briefly, in accordance with the invention, the operating range of a heaterless or pressure-swing adsorbent fractionator is extended to accommodate extreme loading conditions by varying the cycle time of the dryer in response to demand as indicated by the decisions of whether purging and regeneration of the adsorbent is required at the end of the adsorption intervals. Preferably a historical record is kept of the recent purge decisions. The duration of the cycle time is decreased when the historical record indicates that purging of the adsorbent is frequently required and is increased when the historical record indicates that purging of the adsorbent is infrequently required. In order to equalize loading on the sorbent beds, the rate at which the cycle time is increased or decreased is limited to certain extreme values. To prevent this limitation on the rate of change of the cycle time from unduly limiting the response of the adsorbent fractionator to a sudden increase in demand, the cycle time itself is held within certain minimum and maximum values.

BRIEF DESCRIPTION OF THE DRAWINGS

Other objects and advantages of the invention will become apparent upon reading the attached detailed description and upon reference to the drawings in which:

FIG. 1 is a perspective view of a heaterless air dryer employing the control method and apparatus of the present invention;

FIG. 2 is a simplified schematic diagram of the heaterless dryer, moisture sensing probes and pressure switches according to an exemplary embodiment of the invention;

FIG. 5 is a graph of the demand, cycle time, and historical record of purge/hold cycles during typical operation of the exemplary embodiment of the present invention;

FIG. 15 is a flowchart of a subroutine for controlling dryer operation in response to the indicated moisture loading of the beds;

FIG. 16 is a flowchart of a subroutine for changing the cycle time of the dryer in response to a recorded history of purge/hold cycles;

Figure 3:
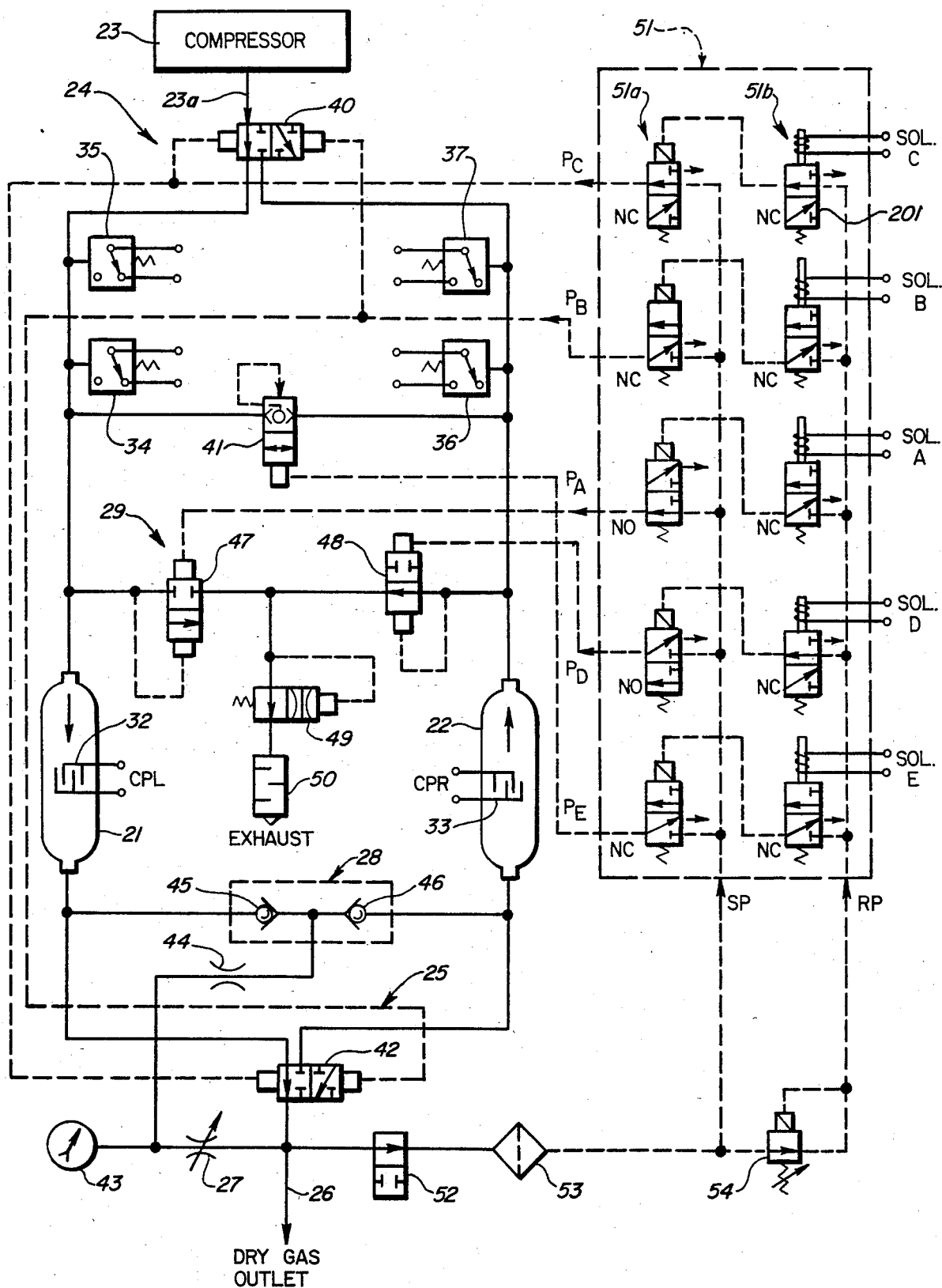
FIG. 3 is a detailed schematic diagram corresponding to the simplified schematic shown in FIG. 2.

While the invention has been described in connection with a preferred embodiment, it will be understood that the intention is not to be limited to the particular form of the invention which has been shown, but the intention is, on the contrary, to cover the various alternative and equivalent constructions included within the spirit and scope of the appended claims.

DETAILED DESCRIPTION OF THE PREFERRED EMBODIMENT

Turning now to the drawings, there is shown in FIG. 1 a perspective view of the main components of a heaterless air dryer generally designated 20. A corresponding schematic diagram is shown in FIG. 2. The air dryer 20 has left and right desiccant beds or chambers 21, 22 for drying air received on an inlet pipe 23a from a compressor 23. An inlet valve assembly generally designated 24 alternately switches the compressed air to the left or right chamber. Similarly an output valve assembly generally designated 25 passes the dry compressed air to an outlet pipe 26. A portion of the dried compressed air expands to approximately atmospheric pressure through a bleeder valve 27 (having an associated pressure gauge 43 and orifice 44) which is ultimately switched to the idle desiccant bed for regeneration. After picking up moisture from the desiccant in the regenerating bed, the air is vented to atmospheric pressure through an exhaust valve assembly 29.

The positions of the valves 24, 25, 28, and 29 are shown for the left desiccant bed 21 serving to dry the air and the right desiccant bed 22 being regenerated. The valves are switched to their alternate positions in order to use the right desiccant bed 22 to dry the compressed air and to allow the left desiccant bed 21 to be regenerated.

As shown in FIG. 1, the electronic components of the control system are enclosed in a centrally located housing 30 and the control system activates the valves 24, 25, 28 and 29 by pneumatic lines (not shown). The control system also has left and right moisture sensing capacitor probes 32, 33 and pressure switches 34, 35, 36 and 37 for sensing the conditions inside the respective left and right desiccant beds 21, 22. Preferably the capacitors 32, 33 are in the form of interleaved parallel metal plates, the alternate plates being electrically connected, and the metal plates being coated with a dielectric material such as Teflon in order to isolate the metal plates from the conductivity of the sorbent and associated electrolytic effects related to contaminants in the sorbent. Of the two pressure switches provided for each bed, one has a high pressure threshold and the other has a low pressure threshold, the thresholds being within the range of pressure encountered during normal operation.

A more complete schematic diagram of the mechanical components and sensors for the heaterless dryer are shown in FIG. 3. The inlet valve assembly 24 is comprised of a single three-way inlet valve 40 driven by a differential pressure input. Associated with this three-way inlet valve is a repressurizing valve 41 which permits the bed having been previously regenerated to be repressurized without substantially interrupting the flow of dry air out the outlet pipe 26. In other words, if the inlet valve 40 were merely switched to repressurize the regenerated bed, the flow of dry air out the outlet pipe 26 could be disrupted during the time required for the pressure to build up in the regenerated bed. In the same fashion as the inlet valve assembly 24, the outlet valve assembly 25 is comprised of a single three-way outlet valve 42 which is driven by the same differential pressure that operates the three-way inlet valve 40. The bleeder valve 27 proportionately divides the outlet pressure across itself and the orifice 44, so that the flow through the orifice is regulated by the adjustment of the bleeder valve. The pressure gauge 43 is responsive to the pressure across the orifice 44 and thus indicates the air flow to the regenerating desiccant bed. The air for regeneration passes through the bleeder valve 27 and through the orifice 44 to a pair of check valves 45, 46 which comprise the valve assembly 28 which directs the dry air to the desiccant bed being regenerated.

The exhaust valve assembly 29 is comprised of two separate two-way valves 47, 48 for dumping the exhaust from the respective chamber during regeneration. These two-way dump exhaust valves are actuated by the difference in pressure in the respective desiccant bed and respective control pressure. The dump exhaust is passed to a dump flow restrictor 49 which limits the exhaust air flow to a reasonably small rate so that the desiccant beads or pellets in the respective bed are not "fluidized" when the respective dump exhaust valve 47, 48 is first opened at the start of regeneration. An exhaust muffler 50 reduces air dynamic noise associated with the dumping of the pressurized bed.

The inlet valve 40, repressurizing valve 41, outlet valve 42, and exhaust valves 47, 48 are operated by pneumatic pressures $P_C$, $P_B$, $P_E$, $P_A$, $P_D$ generated by a solenoid valve and pneumatic relay assembly generally designated 51 including a set of pneumatic relays 51a operated by electromagnetic solenoid valves 51b. The use of pneumatic relays 51a in addition to solenoid valves 51b permit the solenoid valves to be operated by very low relay coil currents of about 250 milliamperes. The pneumatic relays 51a switch air at the high pressure SP of the dry gas outlet 26 as supplied through a valve 52 and a prefilter 53. The solenoid valves 51b, however, operate at a relatively low regulated pressure RP of up to 100 PSI above atmospheric pressure, as set by an adjustable pressure regulator 54, and have a very low flow capacity when they are open. The solenoid valves 51b are all normally closed (NC), while the pneumatic relays 51a are either normally opened (NO), or normally closed (NC) as designated in FIG. 3.

It should be noted that the detailed diagram in FIG. 3 differs significantly from the simplified schematic of FIG. 2 since the exhaust dump valves 47 and 48 in FIG. 3 are separately controllable via solenoids A and D. In practice it is desirable to have both solenoids in the OFF position to close both of the exhaust dump valves during repressurization of the chamber just having been regenerated, as well as during a "purge hold" cycle as described below.

Figure 4:
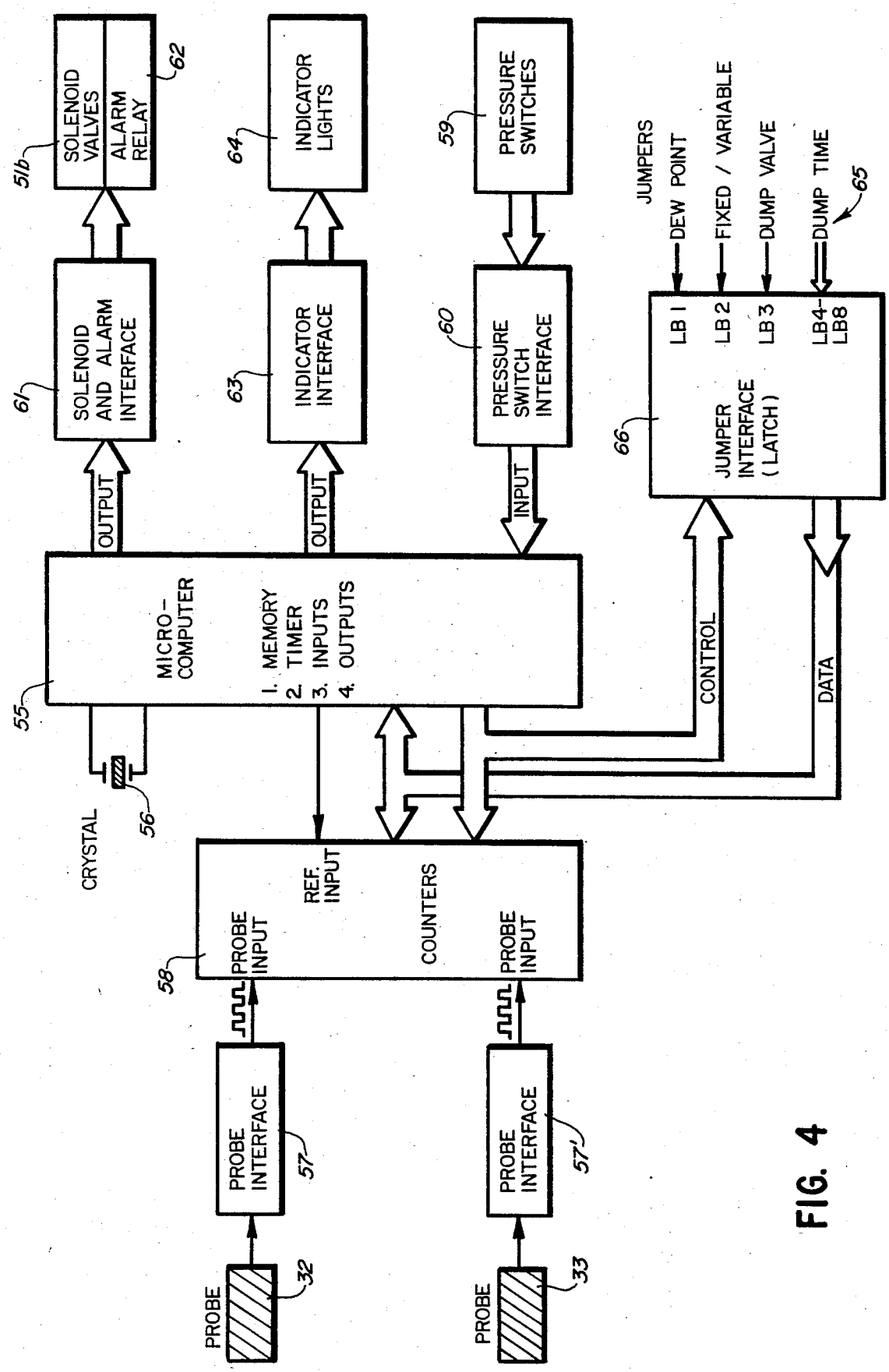
FIG. 4 is a block diagram of the exemplary embodiment of the control system according to the invention.

A block diagram of the control system according to an exemplary embodiment of the invention is shown in FIG. 4. The central component of the control system is a microcomputer integrated circuit 55. The microcomputer is, for example, an Intel Corp. part No. D8748 having an internal crystal oscillator using an external quartz crystal 56, and also having internal random access and fixed or program memory, a timer, and input and output ports. The most significant data are derived from the left and right capacitance probes 32, 33. Probe interface circuits 57, 57' comprise oscillators having frequency setting capacitance inputs connected to the respective probes. The frequencies of oscillation generated by the probe interfaces 57, 57' are indicative of the capacitance of the respective probes and are thus also indicative of whether the respective desiccant beds need to be regenerated. A multiple counter integrated circuit 58, Intel Corp. part No. D8253, has means for counting the frequency generated by each of the probe interfaces 57, 57' and also has a timer counter establishing a predetermined time interval for enabling the other counters so that final counts are obtained indicating the number of cycles generated by each probe interface during the time interval of the timer counter. The microcomputer 55 controls the operation of the counter integrated circuit 58 and also exchanges data with the counter integrated circuit for setting the predetermined time interval of the timer counter and also for initially setting the counters counting the frequencies from the probe interfaces. The microcomputer receives the final counts from the counter integrated circuit 58 so that the microcomputer senses the level of saturation of the desiccant in each bed. The microcomputer 55 also receives pressure data generated by the pressure switches generally designated 59 in FIG. 4, corresponding to the four pressure switches 34–37 shown in FIG. 2. A pressure switch interface 60 processes the pressure switch signals before they are passed to the microcomputer 55.

The microcomputer 55 feeds data to a solenoid and alarm interface 61 for generating a sufficient high current level to drive the solenoid valves 51b and an alarm relay 62. The microcomputer also feeds an output interface 63 for driving a set of indicator lights 64 such as light-emitting diodes (LEDs). These lights indicate whether the left or right desiccant bed is selected for drying the compressed air, whether the dryer is in a "fixed" or "variable" cycle (as further described below), and also indicate probe and valve malfunctions.

Due to the relatively large program capacity of the Intel Corp. part No. D8748 microcomputer, it is desirable to program the microcomputer 55 with a program that can service more than one kind of dryer. Then for assembly or servicing, only one programmed part need be stocked. In order that the microcomputer 55 may know which particular dryer it is to control, a set of jumpers generally designated 65, or alternatively concealed switches, are read by the microcomputer 55 by addressing a jumper interface 66. The jumper interface 66 is, for example, an octal transparent latch with tri-state outputs such as Signetics Corporation part No. 74LS373.

It is desirable to have a jumper to input LB1 to select either a −40° F. dew point or a −100° F. dew point. As will be described further below, the program for the −100° F. dew point requires a shorter cycle time, and therefore greater purge loss, than does the program for the −40° F. dew point. A jumper input LB2 is provided for selecting either a fixed cycle program or a variable cycle program according to the invention, as described further below. A third jumper input LB3 is provided for signalling whether the dryer is conventional as shown in FIG. 3, or is a dryer using solenoid E of FIG. 3 and the pressure signal PE in FIG. 3 to control a dump valve in lieu of the repressurization valve 41. It has been found, for example, that for a −40° F. dew point dryer of relatively small capacity, the repressurization valve 41 is not necessary in many applications, for example in the environment of an off-shore oil rig. In this application, it is desirable to use the solenoid E and pressure signal PE to periodically open a dump or drain valve at the bottom of a coalescing prefilter (not shown) to the air dryer. Usually it is desirable for the dump valve to be opened for 10 seconds every fifteen minutes, although it may be desirable for the dump valve to be dumped for 5 to 20 seconds every 5 to 20 minutes, depending upon the particular circumstances. In order to select the dump time, the other available inputs LB4–LB8 to the jumper interface 66 could be used for selecting one of up to 32 possible prestored selections for the timing of the dump valve. The desired selection, for example, is coded as the binary number or sequence represented by the logic states of the dump time jumpers 65.

For further details on the specific circuitry, programming and mechanical construction for the heaterless air dryer 20 shown in FIG. 1, the reader is referred to Tinker U.S. Pat. No. 4,546,442 issued Oct. 8, 1985 herein incorporated by reference.

The control system described in Tinker for the heaterless dryer 20 in FIG. 1 employed a "fixed-variable" control scheme using fixed cycle times for switching the inlet 24 and outlet 25 valves to alternately change the sorbent bed 21, 22 undergoing adsorption. This control scheme was variable in the sense that after adsorption, a bed was conditionally purged based upon whether the capacitor probe in the respective bed indicated, at about the time of switching, that regeneration of the bed was necessary. This "fixed-variable" control method equalized the loading on the beds since the fixed cycle times prevented the capacity of the heavier-loaded bed from being reduced in the event of a sudden increase in loading. It has been discovered, however, that certain advantages can be obtained by controlled variation of the cycle time based upon a recorded history of the decisions of whether to purge the respective sorbent bed just after it is used for adsorption.

The advantages flowing from such a controlled variation of the cycle time are based upon a trade-off between purge loss, the size or expense of the dryer, and the ability of the dryer to satisfy peak demand, as a function of the cycle time.

Each time a bed is switched or transferred from adsorption, "blown-down" and purged, a volume of purge gas equal to the open volume of the bed vessel is necessarily dumped, and lost. Short cycle times necessarily require higher purge losses than long cycle times.

The ability of a dryer to meet peak demand is directly related to the size and thus the initial cost of the dryer. But the ability of the dryer to meet peak demand also increases as the cycling time decreases.

These considerations lead to the conclusion that if demand were constant, then an optimum size of dryer could be specified to minimize the total cost of the dryer and its operation and maintenance. In practice, however, demand is not constant and in particular fluctuates on a diurnal basis. Once the cycle time is fixed, the peak load that can be met by the dryer is limited by the cycle time chosen and the size of the dryer. Assuming that the peak loads must be satisfied, the dryer cycle time and size must be based on the peak demand, regardless of the average demand placed upon the dryer.

Turning now to FIG. 5, there is shown a graph of the demand, the cycle time, and the record of purge/hold cycles for a heaterless dryer (such as the dryer 20 in FIG. 1) employing an exemplary embodiment of the control system of the present invention. The cycle time is defined in terms of the predetermined adsorption time T, which is called in the art the ½ NEMA cycle time. The NEMA cycle time is the time required for adsorption to switch from one chamber to the other and back again, and is therefore twice the adsorption time T for a single chamber.

In response to a sharp increase in demand, indicated by frequent purging of the beds, the adsorption time T is decreased at a limited rate. The rate is limited in order to equalize the loading on the beds. Similarly, in response to a sharp decrease in demand, the adsorption time T is increased at a limited rate. In this case the rate is limited under the assumption that another increase in demand is likely to occur in the near future, as well as to promote balanced and efficient regeneration of the beds. Also, so that the adsorption time T may best track the demand, the adsorption time T is held within certain maximum and minimum values. This permitted range, in connection with the limited rates of increase and decrease, establishes an upper bound on the response time of the control system.

For a −40° F. dew point dryer, the permitted range for the adsorption time T is preferably 3 minutes to 5 minutes. For a −100° F. dew point dryer, the permitted range for the adsorption time T is preferably 1.25 to 2 minutes. In each case the response time of the control system to extreme changes in demand is preferably limited to twelve adsorption intervals T required for traversing the permitted range in addition to a certain time for the change in demand to be signalled by the record of purge/hold cycles. As shown in FIG. 5, the time for signalling an abrupt increase in demand is about 3 purge cycles and the time for signalling an abrupt decrease is about 5 hold cycles. This is a result of the fact that preferably the cycle time is decreased in response to three consecutive purges, and increased in response to five consecutive holds. Although the time for signalling an abrupt decrease in demand could be decreased to about 3 hold cycles by increasing the cycle time in response to three consecutive holds, five consecutive hold cycles are preferred in order to insure that a subsequent increase in demand is met, under the assumption that a high demand is likely to be frequently interrupted for short intervals during typical operation. In other words, the response of the dryer to demand should have an "attack" as fast as possible, but a "decay" that is slower.

It should be noted that the sizing of the dryer is determined by the peak demand to be accommodated and the minimum adsorption time T. The peak demand therefore becomes the amount of water vapor that can be adsorbed over a time period of T and also desorbed in a time period T, for the specified size of the sorbent bed. Moreover, the trade-off or optimum ratio between minimum adsorption time and dryer size is related to the ratio of the variable cost of dryer operation (including blow-down and purge losses) to the initial cost of the dryer, and is further related to the ratio of the peak demand that must be accommodated to the average demand placed upon the dryer.

Figure 6:
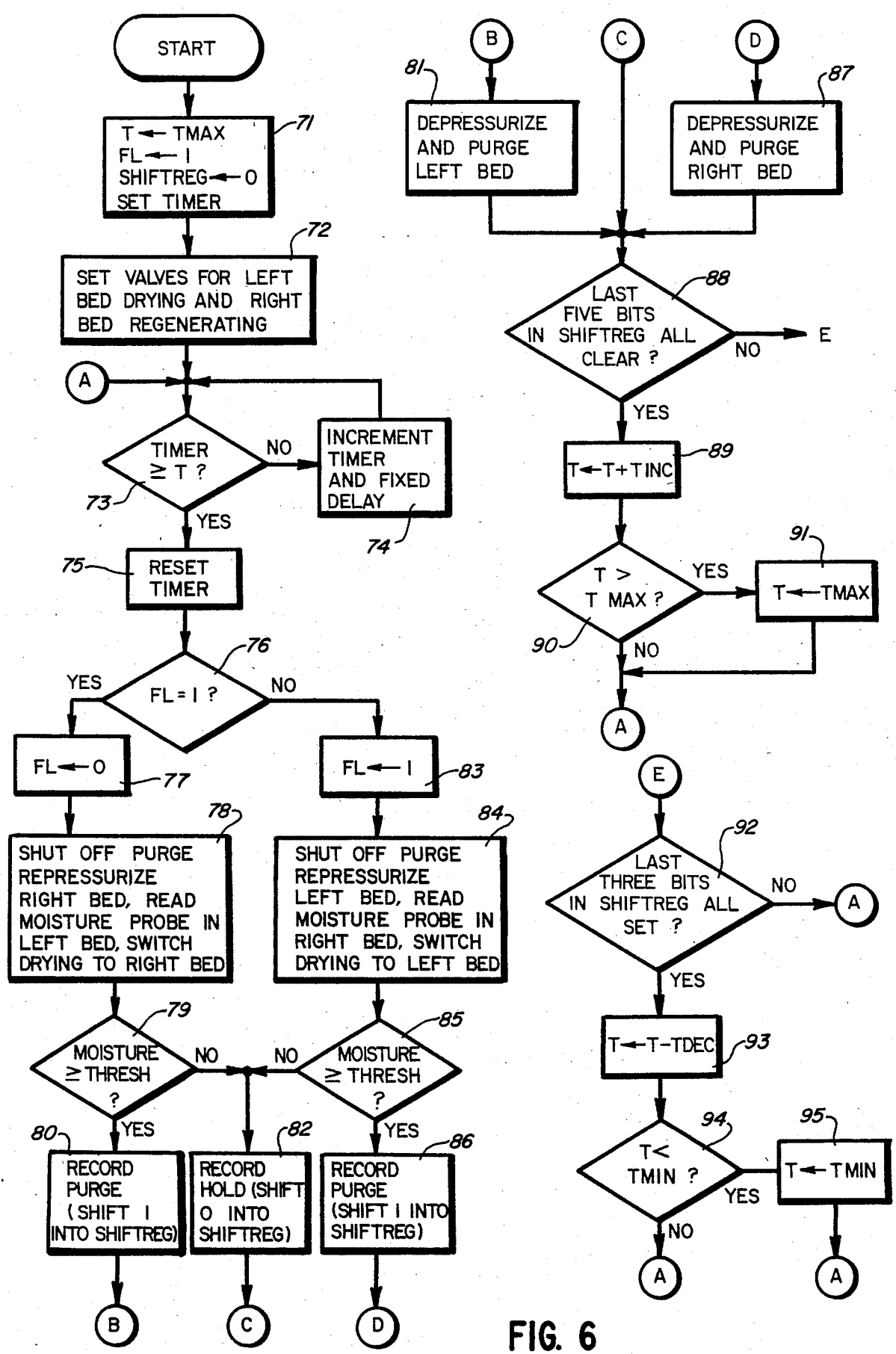
FIG. 6 is a simplified flowchart of a control procedure according to the present invention.

Turning now to FIG. 6 there is shown a simplified flowchart of the preferred control procedure according to the invention. The flowchart is the conventional representation of the software or programming stored in the read-only memory (ROM) of the microcomputer (55 in FIG. 4). In the first step 71 a number of parameters are set to initial values. The parameters are certain memory locations in the random access memory (RAM) of the microcomputer. The adsorption time T is set to its maximum value TMAX. An adsorbing chamber flag (FL) is set to 1 to indicate that the left chamber will first be used for adsorption, as shown in FIG. 2. A shift register (SHIFTREG) is cleared. The shift register is, for example, merely an 8-bit random access memory location used for storage of the recorded history of the purge/hold cycles. For this example, the recorded history includes a record of the 8 most recent cycles of purge/hold. The parameter (T) stores the adsorption time or ½ NEMA cycle time as shown in FIG. 5. In order to measure out the cycle time, a timer (TIMER) is set to a predetermined minimum value in step 71 for later use in clocking the adsorption time T. (The minimum value for setting the timer should account for the minimum or inherent delay through the control cycle of steps 73–95 below.) Next, in step 72, the valves are set for drying the air stream in the left bed and for regenerating the right bed. As shown in FIG. 3, solenoids A, B and E are deenergized, and solenoids C and D are energized.

The adsorption cycle then starts with the adsorption timing being performed in steps 73 and 74. The time elapsed in the adsorption cycle (TIMER) is successively compared to the desired adsorption time T and the timer is successively incremented in step 74 including a fixed delay, until step 73 indicates that the time elapsed in the adsorption cycle reaches the desired adsorption time T. After this occurs, the timer is reset to a predetermined minimum value in step 75 for the next adsorption cycle. (This predetermined minimum value should be the minimum or inherent delay through the entire loop of steps 73–95.)

At the end of the adsorption cycle, in step 76 the adsorbing chamber flag (FL) is compared to 1 to determine whether the adsorption was performed in the left or right chamber. If the adsorbing chamber flag (FL) is a 1, then in step 77 the flag is set to 0 for the next adsorption cycle and the adsorption cycle is terminated in step 78 by shutting off the purge, repressurizing the right bed, reading the moisture probe in the left bed, and switching adsorption or drying to the right bed. To shut off the purge, the right purge exhaust valve 48 is closed by deenergizing solenoid D. The right bed is repressurized by temporarily energizing solenoid E for a short time interval. Solenoid C is deenergized and the moisture probe 32 in the left bed 21 is sampled. Drying is then switched to the right bed by energizing solenoid B.

Blow-down and purge of the left chamber is conditioned upon the moisture reading from the left moisture probe 32. For this purpose, in step 79 the moisture reading is compared to a predetermined threshold, and if the threshold is exceeded, then in step 80 the need for purging the left bed 21 is recorded by right-shifting a logical 1 into the shift register (SHIFTREG). Next in step 81 the left bed is depressurized and purged by energizing solenoid A to open the left purge exhaust valve 47. If in step 79 the moisture reading did not reach the threshold, then in step 82 a "hold" of the left bed is recorded by right-shifting a logical 0 into the shift register (SHIFTREG).

If in step 76 the active chamber flag (FL) is not equal to 1, then in step 83 the flag is set to a logical 1, and in step 84 the purge of the left bed, if any, is shut off by deenergizing solenoid A, the left bed is repressurized by energizing solenoid E for a short time interval, solenoid B is deenergized and the moisture probe 33 in the right bed is sampled, and drying is switched to the left bed by energizing solenoid C. In step 85, the moisture indicating sample from the right probe 33 is compared to the predetermined threshold to determine whether purge of the right chamber 22 is required. If the threshold is reached, then in step 86 the required purge is recorded by shifting right a logical 1 into the shift register (SHIFTREG). Then in step 87 the right bed is depressurized and purged by energizing solenoid D to open the right purge exhaust valve 48.

Now that chamber switching has been completed, the historical record of purge/hold cycles is inspected to determine whether adjustment of the adsorption time T should be performed. In step 88 the last 5 bits stored in the shift register are inspected to determine whether they are all logical 0's. In terms of specific computer operations, since the last 5 bits were right-shifted into the shift register (SHIFTREG), they reside in the 5 most significant bit positions. To test these 5 bits, the shift register is logically AND'ed with a mask having a hexadecimal value of F8. The result is compared to 0, and has a value of 0 if and only if the 5 most significant bits in the shift register are all clear. If so, then the historical record of purge/hold cycles indicates that the adsorption time should be increased in response to the relatively low demand. Therefore, in step 89 the adsorption time T is increased by a predetermined amount (TINC) which sets the maximum rate of increase of the adsorption time T. In steps 90 and 91, however, the adsorption time T is limited to a maximum value (TMAX) by comparing the adsorption time T to the maximum and setting the adsorption time T to the maximum value in step 91 if the adsorption time computed in step 89 exceeds the maximum value.

If in step 88 it is not found that the last 5 bits stored in the shift register (SHIFTREG) are all clear, then in step 92 the last 3 bits stored in the shift register are inspected to determine whether they are all logical 1's, thereby indicating that purging has been frequently required. In terms of specific computer code, the value in the shift register (SHIFTREG) is loaded into the accumulator of is microcomputer, this value in the accumulator is complemented, and the complement is logically AND'ed with a mask having a hexadecimal value of E0. The result is compared to zero, and has a value of zero if and only if the last 3 bits stored in the shift register are all set. In this case in step 93 the adsorption time T is decreased by a predetermined amount (TDEC) setting the maximum rate of decrease in the adsorption time T. In steps 94 and 95, however, the adsorption time T is limited to a minimum value (TMIN) by comparing the adsorption time T to the minimum value and, if the minimum value is exceeded, by setting the adsorption time T in step 95 to the minimum value. Now that the adsorption time has been adjusted, if necessary, based upon the historical record of purge/hold cycles, execution jumps to step 73 in order to perform adsorption for the adsorption time T. Execution of the dryer cycle is then repeated by continuously looping through steps 73–95 as described above.

Figure 7:
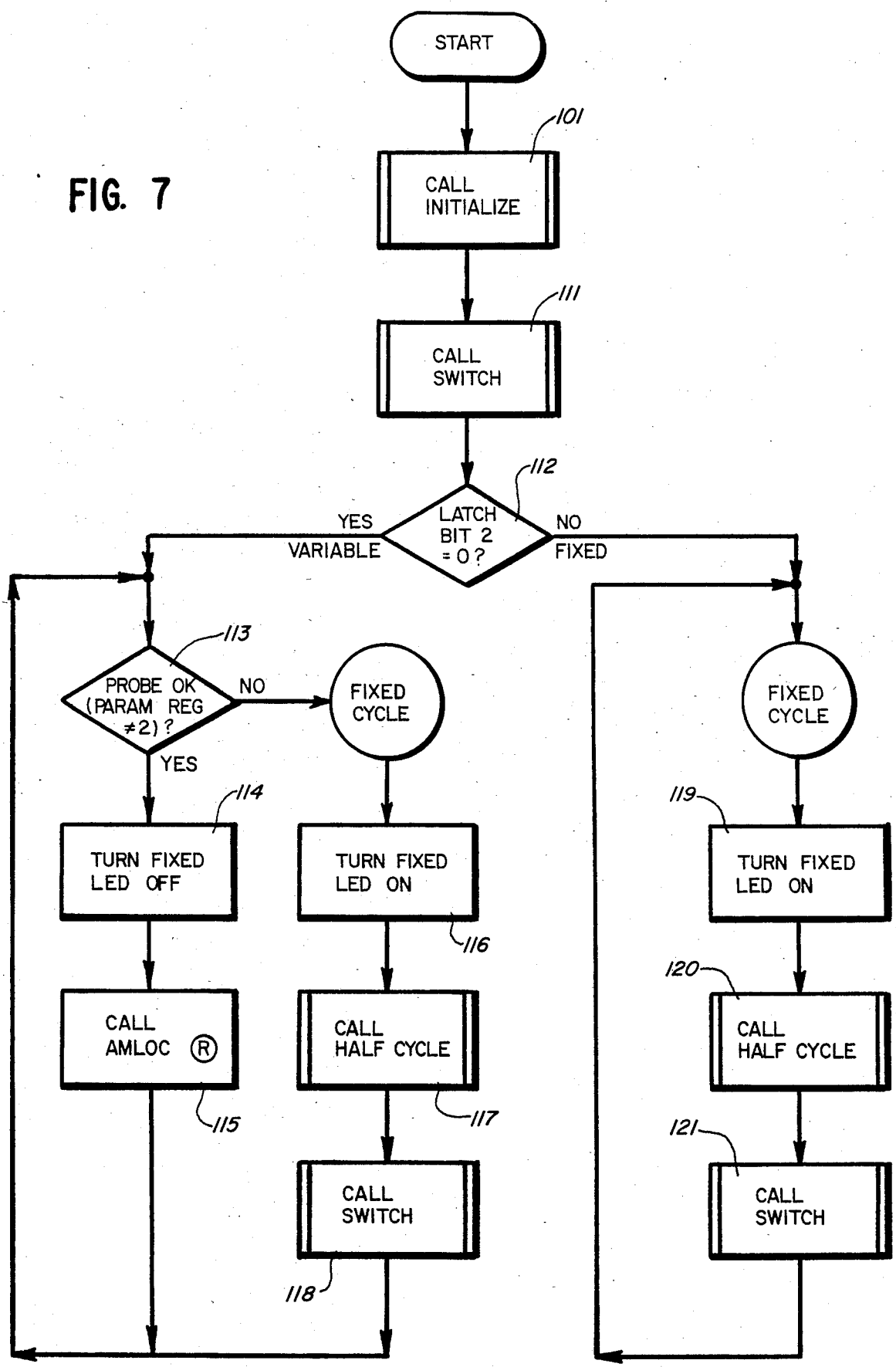
FIG. 7 is a flowchart of an executive procedure for a preferred embodiment of the present invention.

The preferred form of the control software is a modular format shown in FIGS. 7 through 25. A flowchart of the executive program is shown in FIG. 7. In the first step 101, an initialization subroutine shown in FIG. 8 is called.

Figure 8:
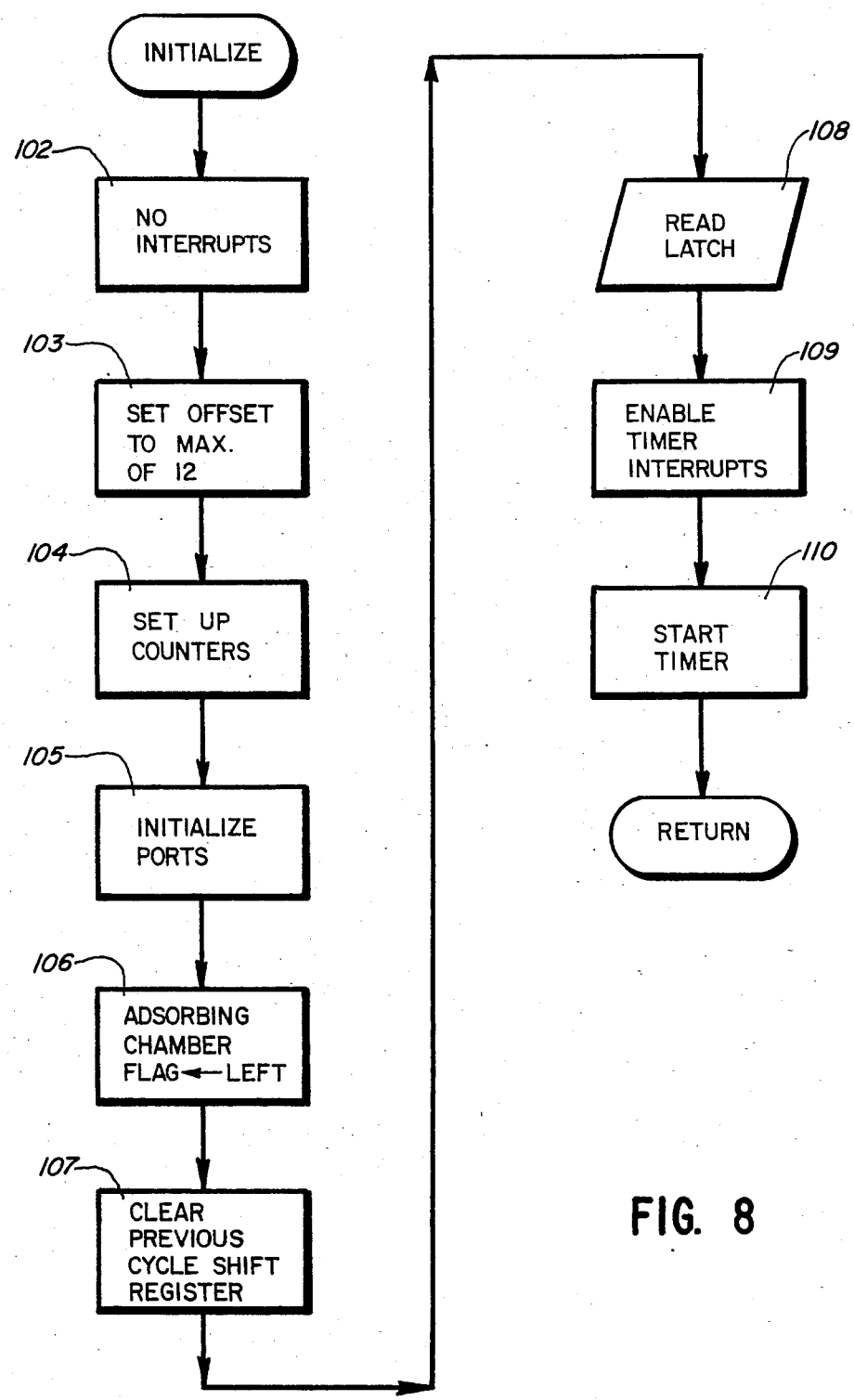
FIG. 8 is a flowchart of an initialization subroutine called by the executive program of FIG. 7.

Turning for the moment to FIG. 8, the initialization subroutine in step 102 clears the interrupts of the microcomputer (55 in FIG. 4). In step 103 an offet which determines the adsorption time T is set to a maximum value of 12. In step 104 the counters (58 in FIG. 4) are set up. Next in step 105 the input and output ports of the microcomputer are initialized. In step 106 the adsorbing chamber flag is set to indicate the left chamber. In step 107 the shift register used to record the purge/hold decisions is cleared. In step 108 the jumper interface or latch (66 in FIG. 4) is read. In step 109 the interrupts for the timer in the microcomputer are enabled. Finally, in step 110, the timer of the microcomputer is started.

Figure 9:
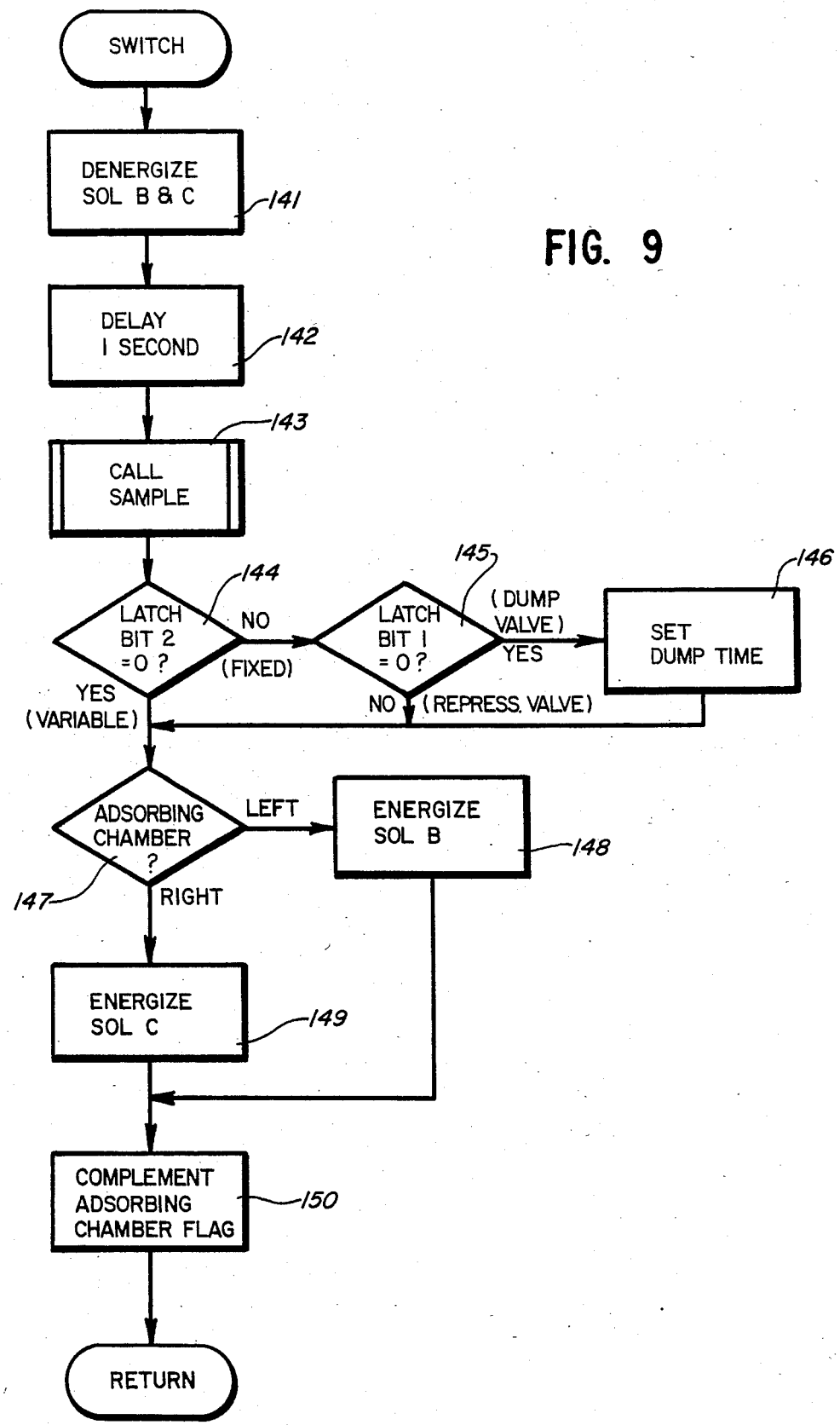
FIG. 9 is a flowchart of a subroutine for switching adsorption from one sorbent bed to another.

Returning to FIG. 7, in step 111 a subroutine SWITCH, further described below in connection with FIG. 9, is called to start the first adsorption cycle. The subroutine SWITCH obtains a moisture indicating sample from the capacitor probe 32, 33 in the bed undergoing adsorption when the subroutine SWITCH is called. Next in step 112 the second of the latch bits (read in step 108 of FIG. 8) is tested to determine whether the second of the jumpers (65 in FIG. 4) is wired to select fixed cycle control, or variable cycle control according to the present invention.

If the latch bit 2 is equal to zero, then variable control is started in step 113 by checking whether the probe used in step 111 is functioning properly. The precise manner of checking the probe will become clear from the discussion below in connection with FIG. 10. If it is found that the probe is functioning properly, then in step 114 a logical flag (FIXED) is cleared and a light emitting diode (64 in FIG. 4) indicating fixed operation is turned off. Next in step 115 an automatic moisture load control cycle is performed by calling a subroutine AMLOC ® further described below in connection with FIG. 15. If a probe malfunction is detected in step 113, then a fixed adsorption cycle is performed by setting the logical flag (FIXED) and turning on the corresponding light-emitting diode (64 in FIG. 4) in step 116, by calling in step 117 a subroutine HALF CYCLE described further below in connection with FIG. 19 in order to perform adsorption, and calling in step 118 the subroutine SWITCH of FIG. 9 in order to switch the beds for the next adsorption cycle.

If in step 112 the latch bit 2 was not equal to zero, then fixed cycles are performed in a similar fashion as described above. In step 119 the logical flag (FIXED) is set and the corresponding light-emitting diode is turned on, in step 120 the subroutine HALF CYCLE is called and in step 121 the subroutine SWITCH is called.

Figure 10:
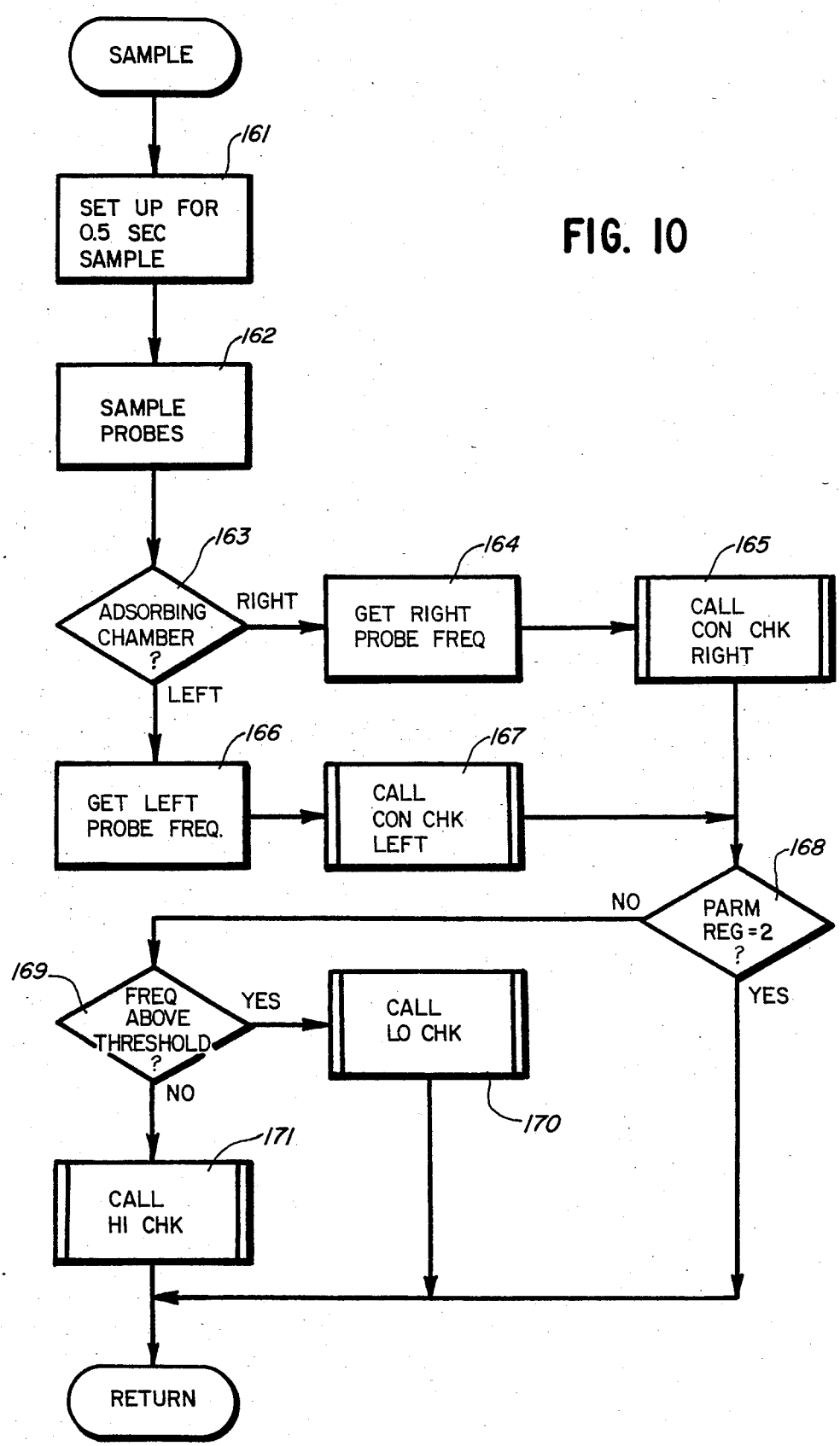
FIG. 10 is a flowchart of a subroutine for sampling the moisture loading of the bed recently having undergone adsorption.

Turning now to FIG. 9, there is shown a flowchart of the subroutine SWITCH. In the first step 141 solenoids B and C are deenergized in anticipation of switching the inlet and outlet valves 40, 42 (see FIG. 3). After a delay of one second in step 142, the SAMPLE subroutine of FIG. 10 is called in step 143 to determine whether the moisture front in the respective bed just having undergone adsorption has passed the respective probe. Next in step 144 the second latch bit is compared to zero to determine whether fixed or variable cycle operation has been selected. If the second latch bit is not equal to zero, then fixed cycle operation has been selected and in step 145 the first latch bit is compared to zero to determine whether solenoid E operates a repressurization valve (41 in FIG. 3) or alternatively a dump valve (not shown). If the first latch bit is equal to zero, solenoid E controls a dump valve and in step 146 the dump time is set based upon latch bits 4 through 8 (LB4–LB8). These latch bits were read from the jumper interface or latch (66 in FIG. 4) in step 108 of FIG. 8. An alternative method (not shown) of selecting the dump time is to use an additional probe interface (see FIG. 4) connected to a fixed capacitor in lieu of a probe. The probe interface can have its frequency adjusted to indicate to the microcomputer the desired frequency or duty cycle of opening the dump valve.

After steps 144, 145 or 146 of FIG. 9, in step 147 the adsorbing chamber flag is tested to determine whether the left or right chamber has just undergone adsorption. If the left chamber has just undergone adsorption, then solenoid B is energized in step 148 to switch the inlet flow of gas on line 23a to the right chamber 22 (see FIG. 3). Otherwise, if the right chamber has just undergone adsorption, then in step 149 solenoid C is energized to direct the flow of gas from the inlet 23a to the left chamber 21. After chamber switching in step 148 or step 149, the adsorbing chamber flag is complemented in step 150 so as to reflect the changed status of the chambers.

Turning now to FIG. 10, there is shown a flowchart of the SAMPLE subroutine. In step 161 the counters (58 in FIG. 4) are set up to count the probe frequencies over a 0.5 second sample interval. The probes are sampled in step 162 by obtaining a number of counts from each probe over each sample interval. Next, in step 163 the adsorbing chamber flag is inspected to determine the chamber undergoing adsorption. If the adsorbing chamber is the right chamber, in step 164 the right probe frequency is obtained and in step 165 the continuity of the connection to the right probe is checked by calling the subroutine CON CHK RIGHT, as further described in FIG. 14.

If in step 163 the left chamber was the adsorbing chamber, then in step 166 the left probe frequency is obtained and in step 167 the continuity of the connection to the left probe is checked by calling the subroutine CON CHK LEFT, as further described below in connection with FIG. 13.

After obtaining the respective probe frequency and checking for the continuity of the connection to the respective probe, in step 168 the value of the program variable called the parameter register (PARAM REG) is tested to determine whether the respective right or left continuity checking subroutine called in step 165 or 167 above found an open connection to the respective probe. As further described below, the parameter register (PARM REG) indicates the health of the respective probe and whether the respective probe indicates that the moisture front in the respective bed has passed the respective probe. If the parameter register (PARM REG) has a value of 2, then an open connection to the respective probe is indicated and execution returns from the SAMPLE subroutine. Otherwise, the respective probe frequency is compared in step 169 to a threshold frequency. The frequency of the probe is inversely proportional to the moisture content in the adsorbent, and the threshold is lower for the −40° F. dew point than for the −100° F. dew point. The threshold is, for example, 10.06 kilohertz for the −40° F. dew point and 14.34 kilohertz for the −100° F. dew point. If the frequency is above the threshold, then in step 170 a subroutine LO CHK, further described below in connection with FIG. 12, is called to check whether the frequency is lower than a predetermined high frequency limit selected to indicate whether the probe is bad. A good probe, in other words, should never generate a frequency in excess of this predetermined high frequency limit. Similarly, if it is found that in step 169 the frequency is not above the threshold, then in step 171 a subroutine HI CHK, further described in connection with FIG. 11, is called to check whether the frequency is greater than a predetermined low frequency limit.

Figure 11:
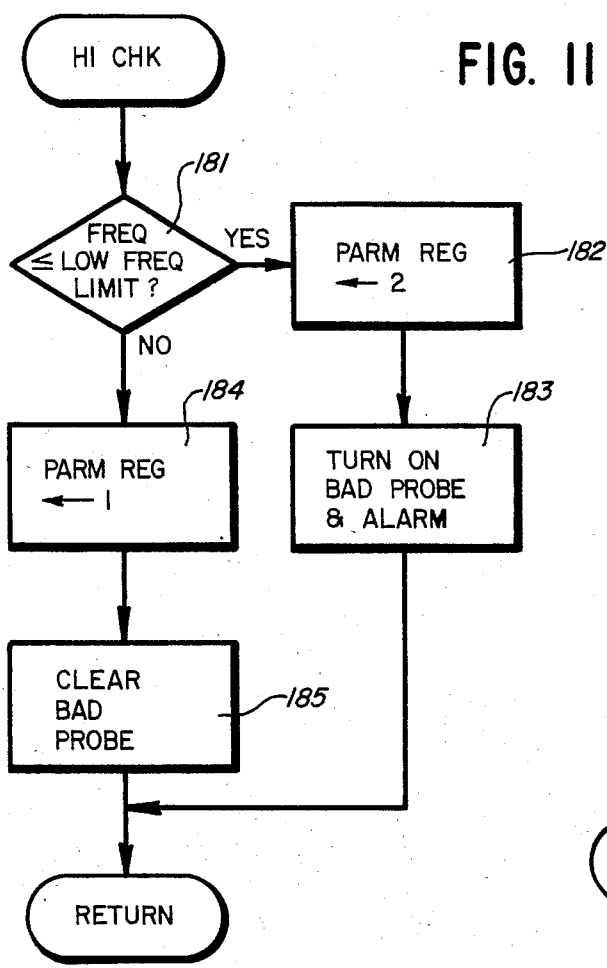
FIG. 11 is a flowchart of a subroutine for checking whether the indicated loading of the bed is excessive.
Figure 12:
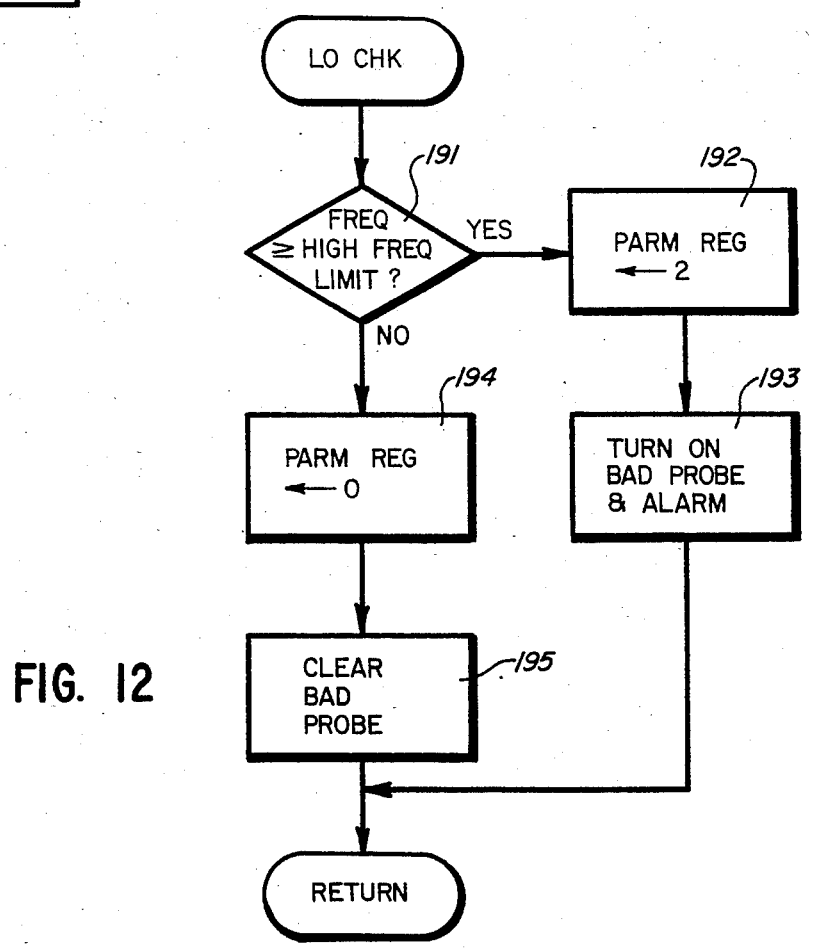
FIG. 12 is a flowchart of a subroutine for checking whether the indicated loading of the bed fails to reach a required minimum value.

Turning now to FIG. 11, there is shown a flowchart of the subroutine HI CHK. In the first step 181 the respective probe frequency is compared to the predetermined low frequency limit. For a −40° F. dew point, the low frequency limit is, for example, 5.97 kilohertz, and for a −100° F. dew point the low frequency limit is 6.15 kilohertz. If the respective probe frequency is less than the low frequency limit, then in step 182 the parameter register (PARM REG) is set equal to 2 to flag the error condition, and in step 183 a "bad probe" light-emitting diode (64 in FIG. 4) is turned on for the respective probe along with an alarm (62 in FIG. 4). If in step 181 it was found that the respective probe frequency did not exceed the low frequency limit, then in step 184 the parameter register (PARM REG) is set equal to 1, and in step 185 any "bad probe" indication is cleared. To clear the "bad probe" indication, the "bad probe" light-emitting diode for the respective probe is turned off, and the alarm is also turned off if no other probe or valve malfunction light-emitting diodes are on.

Turning now to FIG. 12, there is shown a flowchart of the LO CHK subroutine. In the first step 191 the respective probe frequency is compared to a predetermined high frequency limit. The high frequency is, for example, 17.26 kilohertz for a −40° F. dew point and 25.09 kilohertz for a −100° F. dew point. If the probe frequency is greater than or equal to the high frequency limit, then in step 192 the parameter register (PARM REG) is set equal to 2 to flag the error condition and in step 193 a "bad probe" light-emitting diode (64 in FIG. 4) is turned on along with the alarm (62 in FIG. 4). If in step 191 it was found that the respective probe frequency does not reach or exceed the high frequency limit, then in step 194 the parameter register (PARM REG) is set equal to zero, and in step 195 any "bad probe" indication is cleared.

Figure 13:
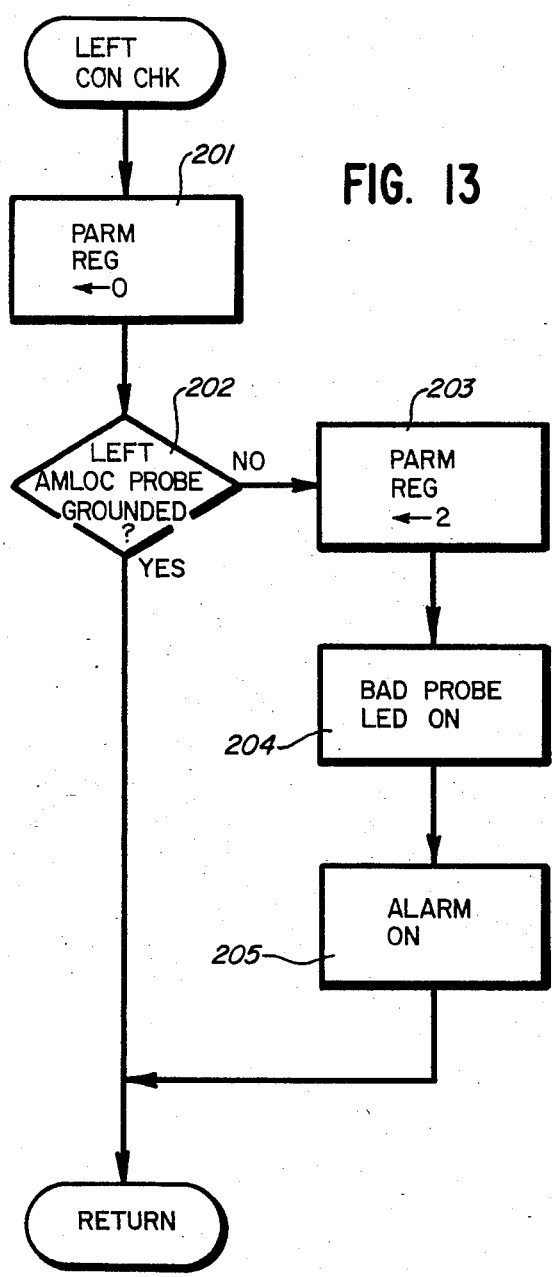
FIG. 13 is a flowchart for testing whether a left moisture sensing probe is grounded.

Turning now to FIG. 13, there is shown a flowchart of the subroutine LEFT CON CHK for checking the continuity of the connection to the left moisture sensing probe. In the initial step 201 the parameter register (PARM REG) is cleared. If the left probe is grounded, as tested in step 202, then execution returns indicating that the continuity of the probe is good. Otherwise, in step 203 the parameter register (PARM REG) is set to 2 to flag the error, in step 204 the "bad probe" light-emitting diode (64 in FIG. 4) for the respective probe is turned on, and in step 205 the alarm (62 in FIG. 4) is turned on.

Figure 14:
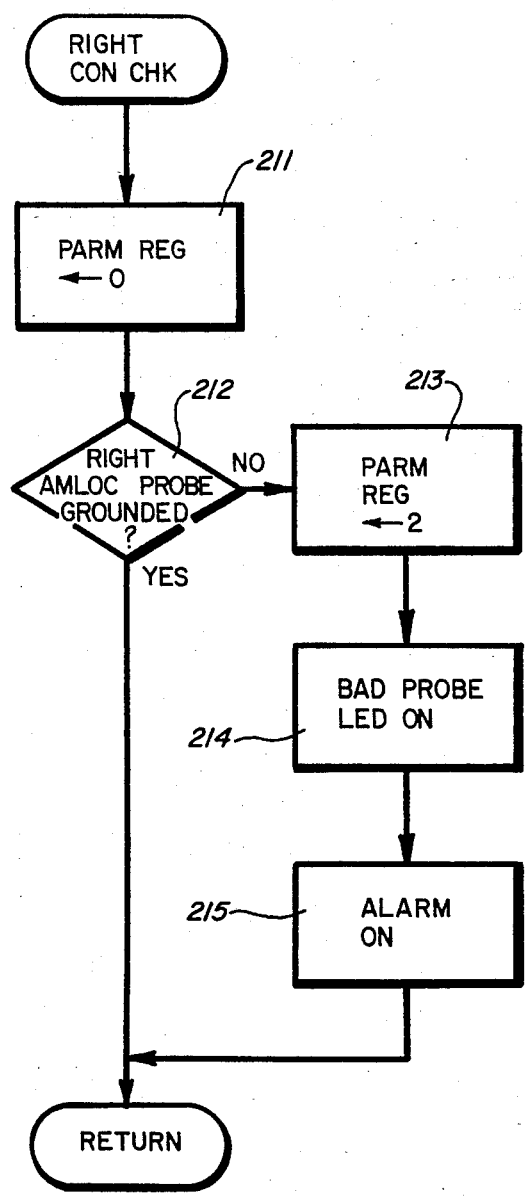
FIG. 14 is a flowchart of a subroutine for testing whether a right moisture sensing probe is grounded.

Turning now to FIG. 14, there is shown the subroutine RIGHT CON CHK for checking the continuity of the right probe. In the initial step 211 the parameter register (PARM REG) is cleared. Then in step 212 the continuity of the right probe is sensed. Execution returns if the right probe is grounded. Otherwise, in step 213 the parameter register (PARM REG) is set to 2, in step 214 the "bad probe" light-emitting diode (64 in FIG. 4) for the respective probe is turned on, and in step 215 the alarm (62 in FIG. 4) is turned on.

Figure 19:
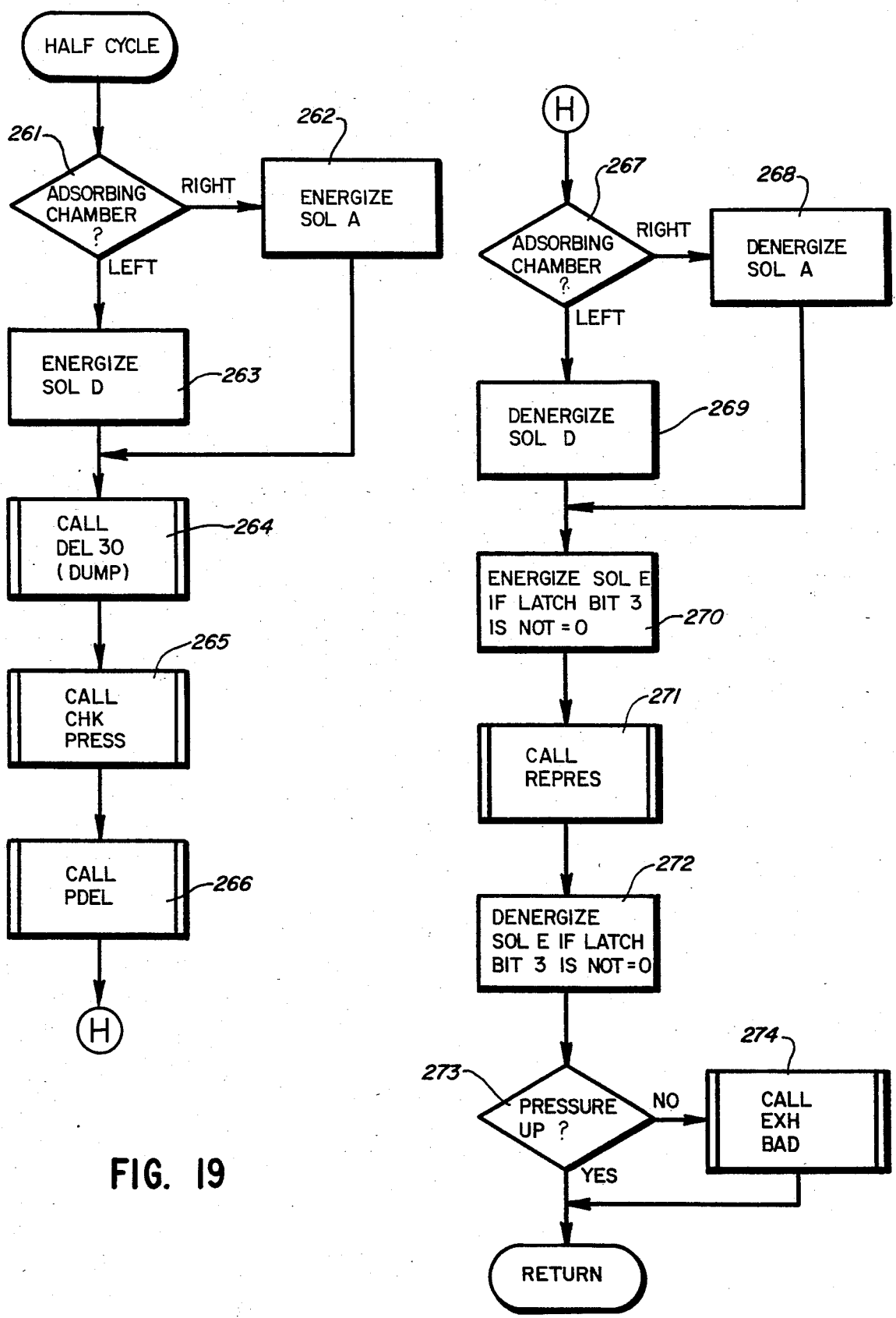
FIG. 19 is a flowchart of a subroutine for depressurizing, purging, and repressurizing a bed in the dryer.
Figure 22:
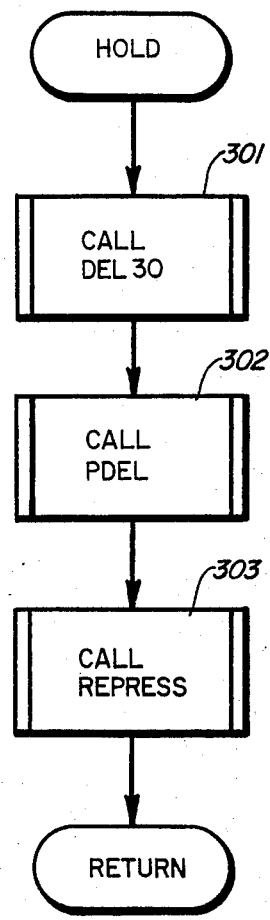
FIG. 22 is a flowchart of a subroutine for "holding" during the time that one bed is adsorbing and the other is on stand-by, not being regenerated.

Turning now to FIG. 15, there is shown a flowchart of the subroutine AMLOC ® for performing adsorption according to the variable cycle control method of the present invention. In the initial step 221 the subroutine UPDATE RATCHET, described further below in connection with FIG. 16, is called to update the adsorption time T based upon the historical record of purge/hold cycles. Then in step 222 the parameter register (PARM REG) is compared to zero to determine whether the moisture front has failed to reach the moisture probe in the respective bed. If so, then in step 223 a subroutine HOLD, further described below in connection with FIG. 22, is called so that the respective chamber is put on stand-by for the duration of the adsorption time T. Otherwise, the respective bed not undergoing adsorption for the current adsorption time T, should be purged. Therefore in step 224 the subroutine HALF CYCLE, described further below in connection with FIG. 19, is called. After holding or purging the respective chamber for the adsorption time T, in step 225 the subroutine SWITCH, previously described in connection with FIG. 9, is called to terminate the current adsorption cycle.

Figure 17:
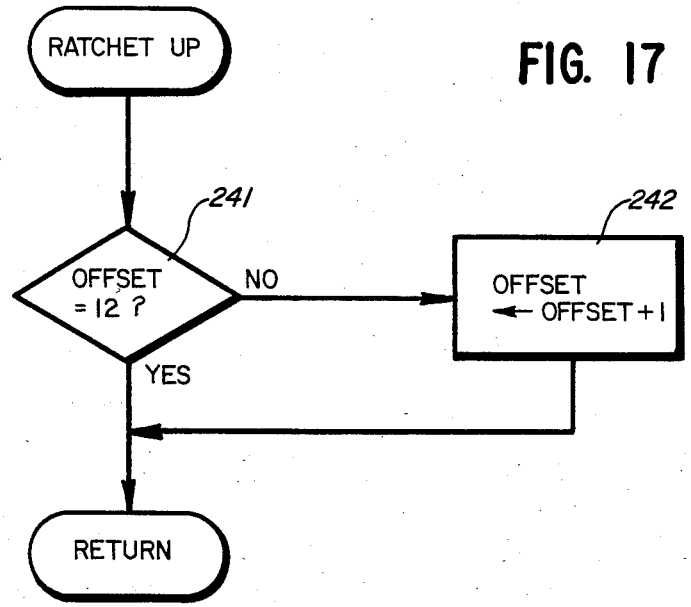
FIG. 17 is a flowchart of a subroutine for increasing the cycle time of the dryer.

Turning now to FIG. 16, there is shown a flowchart of the subroutine UPDATE RATCHET which updates an historical record of the purge/hold cycles and increases or decreases the adsorption time T in response to the historical record. In the first step 231 the last sample from the parameter register (PARM REG) is shifted into the previous cycle shift register. Since the subroutine UPDATE RATCHET is called only by the subroutine AMLOC ® of FIG. 15, the value of the parameter register is either zero or one, indicating whether the previous half cycles included either a hold or a purge, respectively, of the chamber not performing adsorption. Next, in step 232, the previous cycle register is inspected to determine if the last five one-half NEMA cycles all included holds, as indicated by five logical zeros just having been shifted into the previous cycle register. If this condition is found (as described above in connection with step 88 in FIG. 6) then in step 233 a subroutine RATCHET UP, described further below in connection with FIG. 17, is called in order to increase the adsorption time T. If in step 232 all of the last five one-half NEMA cycles did not have holds, then in step 234 the previous cycle register is inspected to determine whether all of the last three one-half NEMA cycles included purges. This condition is indicated by three logical ones having just been shifted into the previous cycle register. If this condition is found (as described above in connection with step 92 in FIG. 6 above), then in step 235 a subroutine RATCHET DOWN, further described below in connection with FIG. 18, is called to decrease the adsorption time T.

Turning now to FIG. 17, there is shown a flowchart of the subroutine RATCHET UP. In the first step 241, if the offset (OFFSET) is equal to a maximum value of 12, then execution returns. Otherwise, in step 242 the offset is increased by a value of 1. It should be noted that the offset is an interger variable representing a number of fixed time units added to a predetermined minimum delay time in order to adjust the adsorption time T, as further described below in connection with FIG. 25.

Figure 18:
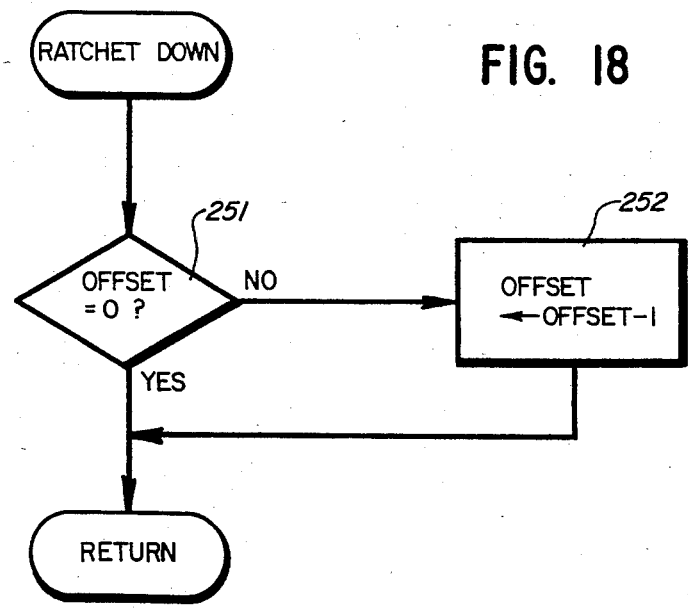
FIG. 18 is a flowchart of a subroutine for decreasing the cycle time of the dryer.

Turning now to FIG. 18, there is shown a flowchart of the subroutine RATCHET DOWN. In the first step 251, the offset is compared to zero. If it is equal to zero, then execution returns. Otherwise, in step 252, the offset is decreased by a value of 1.

It should be noted that since the offset is an interger variable, once it is initially set to a value between zero and its maximum of 12, the subroutines RATCHET UP and RATCHET DOWN insure that the value of the offset is not increased above its maximum value or decreased below zero, so as to maintain the value of the offset between zero and its maximum value of 12.

Turning now to FIG. 19, there is shown a flowchart of the subroutine HALF CYCLE which depressurizes, purges, and repressurizes the respective chamber when the moisture sensing probe determines, at the end of adsorption, that the respective chamber requires regeneration. In the first step 261, the adsorbing chamber flag is inspected to determine whether the right or left chamber is currently undergoing adsorption. If the right chamber is undergoing adsorption, then in step 262 solenoid A is energized in order to open the left purge exhaust valve 47 (see FIG. 3). Otherwise, if the left chamber is in the process of adsorption, then in step 263 solenoid D is energized to open the right purge exhaust valve 48.

Figure 20:
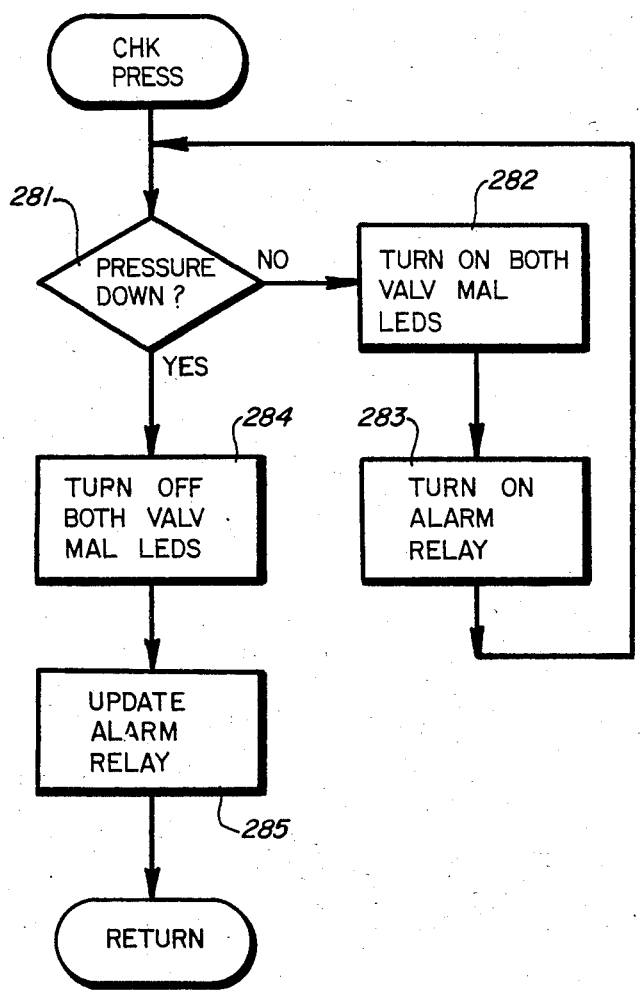
FIG. 20 is a flowchart of a subroutine for signaling a valve malfunction.

Next in step 264 a subroutine DEL30 is called in order to delay for thirty seconds during the dump or "blow-down" of the respective chamber. After this thirty second interval, in step 265 a subroutine CHK PRESS, further described below in connection with FIG. 20, is called to ensure that the pressure in the respective chamber has dropped to a sufficiently low level. Then, in step 266, a subroutine PDEL is called to delay for the purge time required to obtain the desired adsorption time T. A flowchart of the subroutine PDEL is described further below in connection with FIG. 25.

At the end of the purge, the adsorbing chamber flag is tested in step 267 to determine whether the left or right chamber is undergoing adsorption. If the right chamber is undergoing adsorption, then in step 268 solenoid A is deenergized to close the left purge exhaust valve 47 (see FIG. 3). Otherwise, in step 269, solenoid D is deenergized to close the right purge exhaust valve 48.

Figure 21:
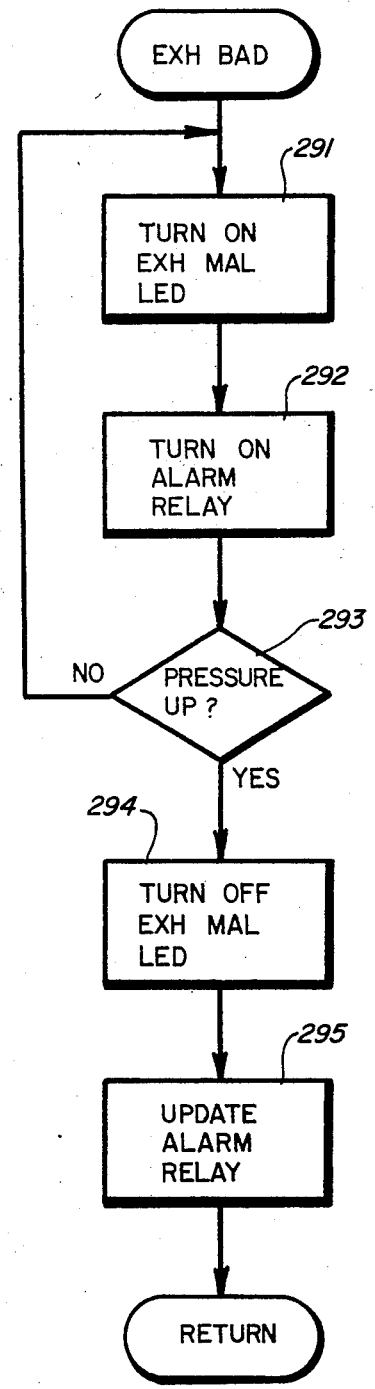
FIG. 21 is a flowchart of a subroutine for signaling an exhaust valve malfunction.
Figure 24:
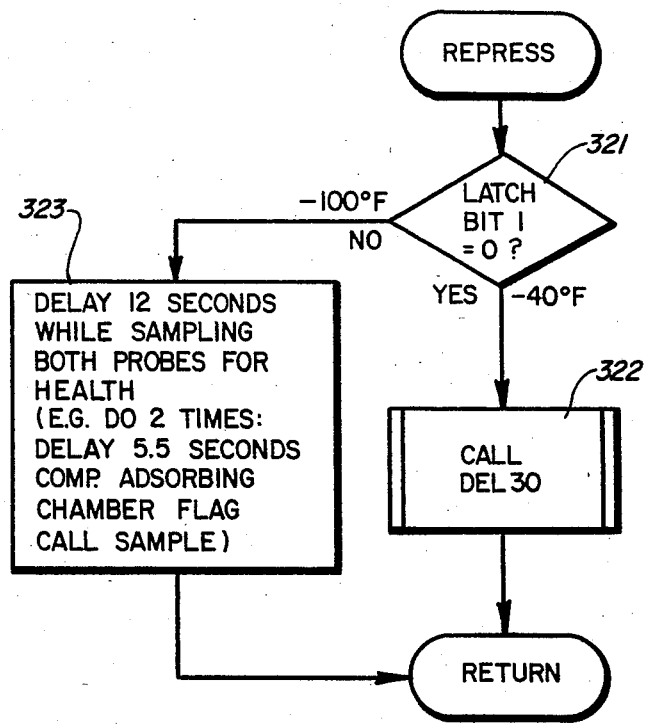
FIG. 24 is a flowchart of a subroutine for waiting during repressurization of a bed.

To repressurize the chamber having undergone regeneration, the repressurization valve 41 (FIG. 3) is opened, unless of course solenoid E controls a dump valve instead. For this purpose in step 270 solenoid E is energized if latch bit 3 is not equal to zero. Then in step 271 a subroutine REPRES, described further below in connection with FIG. 24, is called to provide a sufficient delay for the chamber having been purged to repressurize. Then in step 272 solenoid E is deenergized if latch bit 3 is not equal to zero, in order to close the repressurization valve 41, if a repressurization valve is used. Finally, in step 273 the pressure switches 34-37 are tested to determine whether the chamber having been purged has been repressurized. If not, in step 274 a subroutine EXH BAD, further described below in connection with FIG. 21, is called to indicate the exhaust valve malfunction. Execution then returns, since the subroutine HALF CYCLE is finished.

Turning now to FIG. 20, there is shown a flowchart of the subroutine CHK PRESS for checking whether the respective chamber has been dumped or "blown down" for purging. To check whether the pressure is down, in step 281 the pressure switches 34-37 are sensed. If the pressure is not down, then in step 282 both valve malfunction light-emitting diodes (64 in FIG. 4) are turned on, and in step 283 the alarm relay (62 in FIG. 4) is turned on. If there is an exhaust valve malfunction, the dryer cannot operate and for this purpose execution jumps back to step 281 and the control flow does not continue until the pressure in the respective chamber is down.

When the pressure is down, in step 284 both of the valve malfunction light-emitting diodes are turned off, and in step 285 the alarm relay is turned off unless some other malfunction (such as a probe malfunction) is indicated by the light-emitting diodes (64 in FIG. 4). Execution then returns to the calling program.

Turning now to FIG. 21, there is shown a flowchart of the subroutine EX BAD for indicating an exhaust valve malfunction. In the first step 291 the exhaust valve malfunction light-emitting diode (64 in FIG. 4) is turned on and in step 292 the alarm relay (62 in FIG. 4) is turned on. In order to test whether the respective chamber has repressurized, in step 293 the pressure switches 34-37 are sensed. Execution jumps back to step 291 until the pressure switches indicate repressurization has occurred. At that time, in step 294 the exhaust valve malfunction light-emitting diode is turned off, and in step 295 the alarm relay is turned off unless some other malfunction is indicated. Execution then returns to the calling program.

Figure 23:
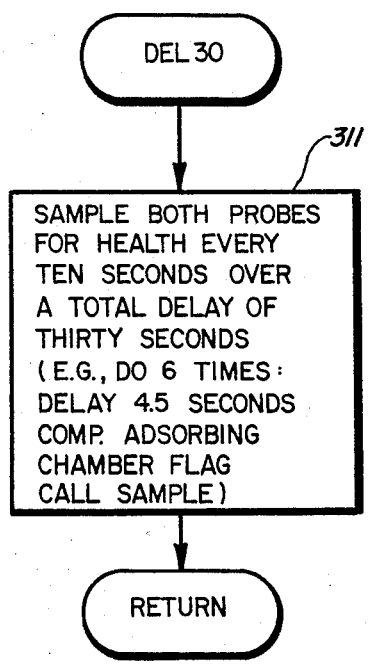
FIG. 23 is a flowchart of a subroutine for waiting for 30 seconds during holding or regeneration.
Figure 25:
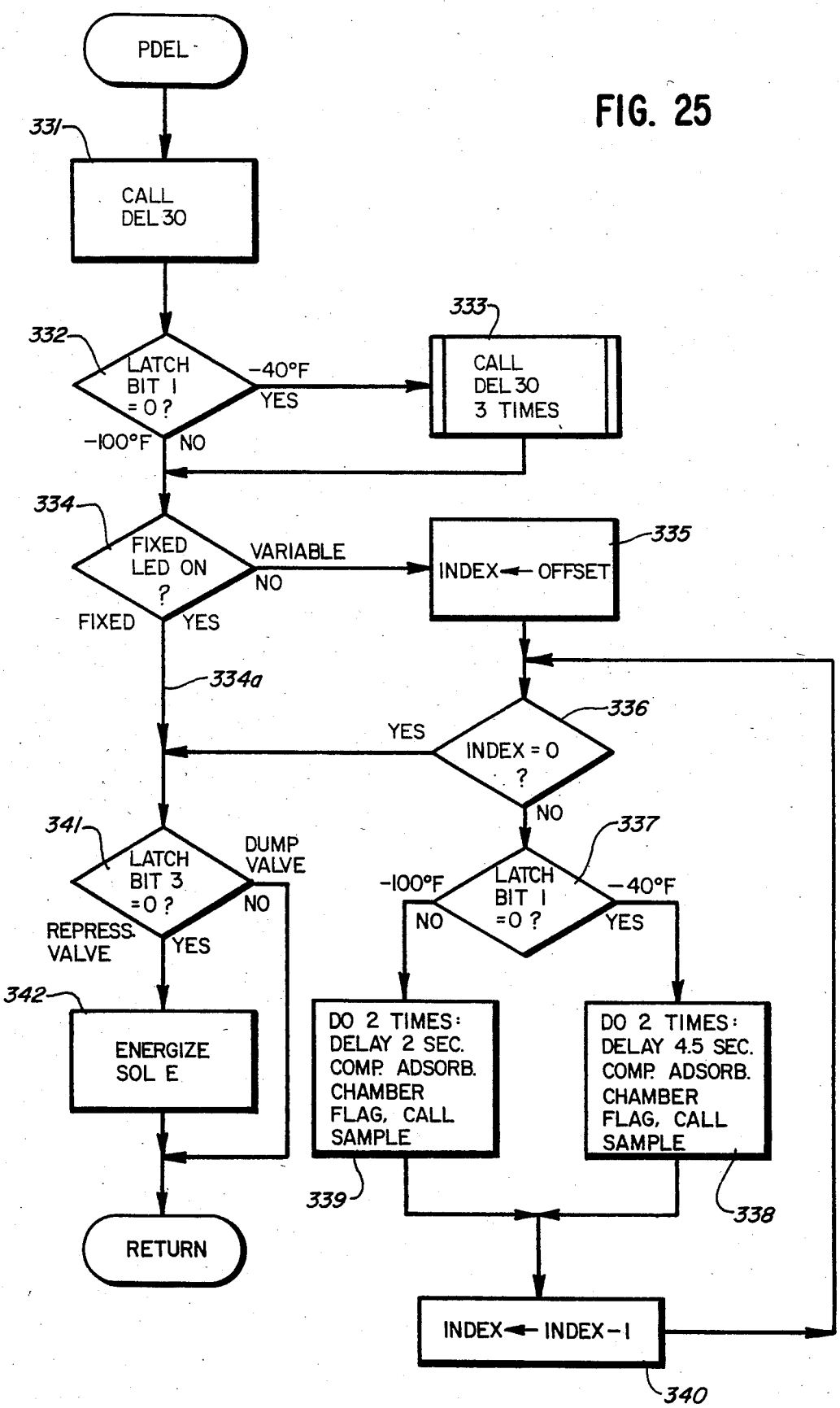
FIG. 25 is a flowchart of a subroutine for performing a variable delay to achieve a preselected adsorption time.

Turning now to FIG. 22, there is shown a flowchart of the subroutine HOLD for holding the inactive chamber for the adsorption time T. In the first step 301 the subroutine DEL30, described further below in connection with FIG. 23, is called in order to delay for 30 seconds. Then in step 302 the subroutine PDEL, described further below in connection with FIG. 25, is called in order to delay for a variable time selected to obtain the desired adsorption time T for the one-half NEMA cycle. Finally, in step 303, the subroutine REPRESS, described further below in connection with FIG. 24, is called in order to wait for a certain time to allow the inactive chamber to repressurize before execution returns to the calling program.

Turning now to FIG. 23, there is shown a flowchart of the subroutine DEL30. In step 311, both of the probes are sampled for health every ten seconds over a total delay of 30 seconds. Preferably this function is performed by repeating for six times the following: a delay of 4.5 seconds, complementing the adsorbing chamber flag, and calling the subroutine SAMPLE shown in FIG. 10. Note that step 161 in the subroutine SAMPLE accounts for a delay of 0.5 seconds.

Turning now to FIG. 24, there is shown a flowchart of the subroutine REPRESS for repressurizing the inactive chamber or the chamber having just been purged. In the first step 321, the first latch bit (LB1 in FIG. 4) is compared to zero to determine whether a −40° F. dew point or a −100° F. dew point has been selected. For a −40° F. dew point, the preferred time for repressurization is 30 seconds. Therefore, in step 322 the subroutine DEL30 of FIG. 23 is called. Otherwise, for a −100° F. dew point, a shorter repressurization time of 12 seconds is preferred. Therefore, in step 323 a 12 second delay is provided while sampling both of the moisture sensing probes for health. Specifically, the following is performed two times: after a delay of 5.5 seconds, the adsorbing chamber flag is complemented and the subroutine SAMPLE of FIG. 10 is called.

Turning now to FIG. 25, there is shown a flowchart of the subroutine PDEL for performing a variable delay to achieve the desired adsorption time T. In order to set up a minimum purge delay time, in the first step 331 the subroutine DEL30 of FIG. 23 is called. This provides a total minimum adsorption time of about 75 seconds for −100° F. dew point operation. For −40° F. dew point operation, however, a minimum adsorption time of 3 minutes is preferred. Taking into consideration the fact that the repressurization delay in FIG. 24 for the −100° F. dew point is different from the repressurization delay for the −40° F. dew point, an additional delay of about 90 seconds is required to set up the minimum adsorption time for the −40° F. dew point. Therefore, in step 332 the first latch bit is compared to zero to determine whether a −40° F. dew point or a −100° F. dew point has been selected. In the event that a −40° F. dew point has been selected, in step 333 the subroutine DEL30 of FIG. 23 is called three times resulting in an additional 90 second delay.

If fixed cycle operation is being performed, either as a result of the second jumper selection (65 in FIG. 4) or as a result of probe failure as tested in step 113 of FIG. 7, the minimum adsorption time is used in order that the dryer will operate at its full rated capacity. For variable cycle operation, however, an additional delay may be required based upon the value of the offset (OFFSET). To determine whether the dryer is operating in a fixed or variable cycle, the state of the "fixed" light-emitting diode (64 in FIG. 4) is sensed in step 334. If the "fixed" light-emitting diode is off as indicated by the corresponding flag (FIXED), then the dryer is in a variable cycle. An additional delay is required unless the value of the offset (OFFSET) has a value of zero. The value of the offset specifies the additional delay as a number of time units. The preferred time unit is 10 seconds for a −40° F. dew point, and 5 seconds for a −100° F. dew point.

In order to perform the variable delay, in step 335 the value of the offset (OFFSET) is transferred to an index register (INDEX). In step 336 the value of the index register (INDEX) is compared to zero to test whether an additional delay is required. If the value of the index register is not equal to zero, then an additional delay is required. In step 337 the first latch bit is compared to zero to determine whether the additional delay is for a −40° F. dew point or a −100° F. dew point. If the first latch bit is equal to zero, then an additional delay of 10 seconds is obtained in step 338 while the probes are sampled for health. Specifically, in step 338 the following is performed: after a delay of 4.5 seconds, the adsorbing chamber flag is complemented and the subroutine SAMPLE of FIG. 10 is called. Otherwise, if step 337 determines that a −100° F. dew point has been selected, then in step 339 an additional delay of 5 seconds is obtained while sampling the probes for health. Specifically, the following is performed twice: after a delay of 2 seconds, the adsorbing chamber flag is complemented and the subroutine SAMPLE of FIG. 10 is called.

It should be noted that for the procedure shown in FIG. 25, the adsorption time T for fixed cycle operation in steps 116, 117 and 118 of FIG. 7 resulting from probe failure is the same as the adsorption time T for jumper-selected fixed cycle operation. Depending on the frequency of demand peaks, it may be desirable to have the adsorption time for jumper-selected fixed cycle operation to be greater than the adsorption time for fixed cycle operation resulting from probe failure. If demand peaks are infrequent for variable cycle applications and depending on the demand in relation to standard dryer sizes, the optimum adsorption time for applications having fixed demand could be significantly less than the minimum time for variable cycle operation (which is the adsorption time for fixed operation resulting from probe failure). In this case a conditional delay step could be inserted in branch 334a from step 334 of FIG. 25. The conditional delay would be performed if the second latch bit (LB2 in FIG. 4) is a logical 1. Moreover, the time for this conditional delay could be selected by one or more of the "dump time" latch bits (LB4–LB8 in FIG. 4) to provide additional control flexibility in fixed-cycle applications.

After the additional delay of step 338 or step 339, the value of the index register (INDEX) is decremented by 1 in step 340. Execution returns to step 336 and if necessary the adsorption cycle delays for additional time units until the value of the index register reaches zero, as tested in step 336.

After the fixed or variable delay, the repressurization valve (41 in FIG. 3) is opened to repressurize the chamber not performing adsorption, if a repressurization valve is provided for this purpose. Therefore, in step 341 the third latch bit is compared to zero to determine whether a repressurization valve is provided. If so, then in step 342 solenoid E is energized to open the repressurization valve. This completes the description of the preferred embodiment of the variable cycle control procedure according to the present invention.

In view of the above, an economical and reliable method has been described for extending the operating range of a heaterless adsorbent fractionator. To accommodate infrequent peak demands, the cycle time of the fractionator could be automatically decreased to a minimum value that would be unacceptable for continuous fixed or "fixed-variable" operation due to losses from more frequent "blow-down" of the sorbent beds. Similarly, the cycle time of the fractionator is automatically increased to promote more efficient operation under low loading conditions. The method is economical and reliable since the sensing of the demand on the sorbent beds is performed by the same capacitor probes in the beds that sense whether to blow-down and purge the beds after adsorption. The range and time rate of change of the cycle time is limited to predetermined values based upon the required dewpoint so that relatively equal loading on the beds is insured. Moreover, the response of the variation in cycle time to a substantial change in demand preferably has a fast attack and a slower decay selected to accommodate typical demand characteristics.

What is claimed is:

1. A process for reducing the concentration of first gas in mixture thereof with a second gas to below a limiting maximum concentration thereof in the second gas, which comprises the steps of:
   (a) during a predetermined time interval, passing an influent flow of the mixture through a bed of a sorbent having a preferential affinity for the first gas, adsorbing the first gas thereon to form a gaseous effluent having a concentration thereof below the maximum, and forming a concentration gradient of first gas in the bed progressively decreasing from one end to the other end as the adsorption continues and an increasing concentration of first gas in the second gas defining a concentration front progressively advancing in the bed from one end to the other end as sorbent capacity thereof decreases;
   (b) sensing whether the first gas front in said sorbent bed has advanced by a predetermined extent at the end of said first predetermined time interval to decide whether purging of said sorbent bed is required after said predetermined time interval;
   (c) at the end of said predetermined time interval, closing off the influent flow of gas, and in response to the decision in step (b), conditionally depressurizing the bed of said sorbent and introducing a purge gas to regenerate said sorbent; and thereafter,
   (d) repeating steps (a), (b) and (c) above;
   wherein said process further comprises, recording a history of the decision in step (b) of whether purging of said sorbent bed is required, and during the repetition of steps (a), (b) and (c) above, decreasing the duration of said predetermined time interval based upon said recorded history indicating that purging of said sorbent bed is frequently required, and increasing said predetermined time interval based upon said recorded history indicating that purging of said sorbent bed is infrequently required.

2. The process as claimed in claim 1, wherein the duration of said predetermined time interval is limited so as not to exceed a predetermined maximum duration.

3. The process as claimed in claim 1, wherein the duration of said predetermined time interval is limited so as not to be less than a predetermined minimum duration.

4. The process as claimed in claim 1, wherein the duration of said predetermined time interval is decreased at most by a predetermined amount of time during each cycle of repetition of steps (a), (b) and (c).

5. The process as claimed in claim 1, wherein the duration of said predetermined time interval is increased at most by a predetermined amount of time during each cycle of repetition of steps (a), (b) and (c).

6. The process as claimed in claim 1, wherein the recorded history includes a record of whether purge was required in a certain plurality of the most recent cycles of repetition of steps (a), (b) and (c).

7. A process for reducing the concentration of first gas in mixture thereof with a second gas to below a limiting maximum concentration thereof in the second gas, which comprises passing an influent flow of the mixture through a bed of a sorbent having a preferential affinity for the first gas; adsorbing first gas thereon to form a gaseous effluent having a concentration thereof below the maximum, and forming a concentration gradient of first gas in the bed progressively decreasing from one end to the other end as the adsorption continues and an increasing concentration of first gas in the second gas defining a concentration front progressively advancing in the bed from one end to the other end as sorbent capacity thereof decreases; closing off the influent flow of gas after a predetermined time interval; sensing the advance of the first gas front in the bed, conditionally depressurizing the sorbent bed and introducing a purge gas to regenerate said sorbent without application of heat at the end of said time interval when said gas front has advanced by a predetermined extent, wherein the process further comprises, conditionally decreasing the duration of said predetermine time interval by a predetermined amount when said sorbent bed is depressurized at the end of said time interval, and conditionally increasing the duration of said predetermined time interval by a predetermined amount when said sorbent bed is not depressurized at the end of said time interval, thereafter returning the sorbent bed to the adsorption mode after said predetermined time interval.

8. The process as claimed in claim 7, wherein the advance of the first gas front in the bed is determined by sensing the capacitance of a capacitor in which the sorbent is the dielectric at a point between the inlet and outlet ends of the bed, and comparing said capacitance to a predetermined threshold.

9. The process as claimed in claim 8, wherein the capacitance of said capacitor determines the frequency of an oscillator, and the frequency of the oscillator is measured and compared to a predetermined frequency corresponding to said threshold to determine whether said gas front has advanced by said predetermined extent.

10. The process as claimed in claim 7, wherein the duration of said predetermined time interval is limited so as not to exceed a predetermined maximum and so as not to be less than a predetermined minimum.

11. The process as claimed in claim 7 being repetitively performed and wherein said process further comprises recording a history of whether said sorbent bed is depressurized at the end of said time interval, and wherein said step of conditionally decreasing the duration of said predetermined time interval is further conditioned by the requirement that the recorded history must indicate that purging was frequent in the recent past for said predetermined time interval to be decreased when said sorbent level is depressurized at the end of said time interval, and wherein said step of conditionally increasing the duration of said predetermined time interval is further conditioned by the requirement that the recorded history must indicate that purging was infrequent in the recent past for said predetermined time interval to be increased when said sorbent bed is depressurized at the end of said time interval.

12. A cyclic process for reducing the concentration of first gas in mixture thereof with a second gas to below a limiting maximum concentration thereof in the second gas which comprises, (a) passing an influent flow of the mixture of gas through one of two chambers of sorbent having a preferential affinity for the first gas;

(b) adsorbing first gas on the sorbent in said one of said two chambers for a predetermined adsorption time interval;

(c) sensing whether the amount of first gas adsorbed on the sorbent in said one of said two chambers during said adsorption time interval exceeds a predetermined threshold to decide whether purging of said sorbent in said one of said two chambers is required after said adsorption time interval;

(d) at the end of said adsorption time interval, switching the influent flow of gas to the other of said two chambers, and conditionally depressurizing and purging the chamber of sorbent no longer receiving said influent flow of gas based upon the decision made in step (c), and conditionally changing the duration of said adsorption time interval based upon whether the chamber no longer receiving said influent flow of gas is depressurized and purged so that said duration of the adsorption interval decreases at a limited rate when purging is frequent and increases at a limited rate when purging is infrequent, and limiting the duration of said adsorption time interval so as not to exceed a predetermined maximum and so as not be less than a predetermined minimum; and (e) repeating steps (b), (c) and (d) using the conditionally changed adsorption time interval.

13. The cyclic process as claimed in claim 12, wherein step (c) further comprises recording in a historical record the decision of whether purging of said sorbent is required, and wherein in step (d) the duration of said adsorption time interval is conditionally changed based upon said historical record.

14. The cyclic process as claimed in claim 13, wherein said historical record includes said decisions for a certain plurality of past consecutive cycles of steps (b), (c) and (d).

15. The cyclic process as claimed in claim 13, wherein the duration of said adsorption interval is decreased in response to a certain plurality of last consecutive decisions that purging was required, and is increased in response to a certain plurality of last consecutive decisions that purging was not required.

16. The cyclic process as claimed in claim 15, wherein said certain plurality of last consecutive decisions that purging was not required exceeds said certain plurality of last consecutive decisions that purging was required.

17. The cyclic process as claimed in claim 16, wherein said certain plurality of last consecutive decisions that purging was not required is five and said certain number of last consecutive decisions that purging was required is three.

18. The cyclic process as claimed in claim 12, wherein the amount of first gas adsorbed on the sorbent is sensed by the capacitance of a capacitor in which the sorbent is the dielectric at a point between the inlet and outlet ends of the bed.

19. A cyclic process for reducing the concentration of first gas in mixture thereof with a second gas to below a limiting maximum concentration thereof in the second gas, said process comprising the steps of:
   (a) passing an influent flow of gas through one of said two chambers of sorbent having a preferential affinity for the first gas;
   (b) adsorbing first gas on the sorbent in said one of two chambers for a predetermined adsorption time interval;
   (c) sensing the amount of first gas adsorbed on the sorbent by the capacitance of a capacitor in which the sorbent is the dielectric at a point between the inlet and outlet ends of the bed and at the end of said adsorption time interval by comparing the capacitance of said capacitor to a predetermined threshold to decide whether purging of said sorbent in said one of said two chambers is required after said adsorption time interval, and recording the decision in a historical record including decisions for a certain plurality of past decisions;
   (d) at the end of said predetermined time interval, switching the influent flow of gas to the other of said two chambers, and conditionally depressurizing and purging the chamber of sorbent no longer receiving said influent flow of gas in response to the decision just made in step (c), and decreasing the duration of the adsorption time interval by a certain amount in response to said historical record indicating frequent purging, and increasing the duration of the adsorption interval by a certain amount in response to said historical record indicating infrequent purging, and limiting the duration of the adsorption time interval so as not to exceed a predetermined maximum and so as not to be less than a predetermined minimum; and
   (e) repeating steps (b), (c) and (d) using the adsorption time interval from the previous step (d).

20. The cyclic process as claimed in claim 19, wherein said sorbent is purged without the application of heat.

21. The cyclic process as claimed in claim 19, wherein the duration of the adsorption time interval is decreased in response to the historical record that the last three consecutive decisions are decided that purging of the respective chamber was required, and wherein the duration of the adsorption time interval is increased in response to the historical record indicating that the last five consecutive decisions all decided that purging of the respective chamber was not required.

22. The cyclic process as claimed in claim 19, further comprising the steps of determining said predetermined minimum and maximum and certain amounts in response to selection of a desired dew point.

23. A control system for a pressure-swing desiccant gas dryer having a first desiccant bed and a second desiccant bed, gas to be dried being alternately directed by valves to pass through one of the beds providing adsorption of vapor while the other desiccant bed is being regenerated after depressurization or is in an idle condition in response to at least one cyclic bed select signal and at least one regeneration enable signal, respectively, the control system comprising, in combination,
   a capacitance probe in each desiccant bed so that the level of condensate saturation of the desiccant in each bed is indicated by the capacitance of the respective probe,
   a probe interface for generating a digital signal indicating the capacitance of the probe in the desiccant bed undergoing regeneration,
   a microcomputer executing a stored sequence of instructions, said microcomputer comprising means for generating said bed select signal to switch the bed providing adsorption after a predetermined adsorption time interval,
   means for receiving said digital signal generated by said probe interface at the end of said adsorption time interval, comparing said digital signal to a predetermined threshold signal representative of the condensate saturation level for which regeneration is required, and generating said regeneration enable signal in response to said means for comparing the final count to the predetermined threshold indicating that regeneration is required, and
   means for conditionally changing the duration of said adsorption time interval in response to said regeneration enable signal so that said duration of the adsorption interval decreases at a limited rate when purging is frequent and increases at a limited rate when purging is infrequent, and for limiting the duration of said adsorption time interval so as not to exceed a predetermined maximum and so as not to be less than a predetermined minimum.

24. The control system as claimed in claim 23, further comprising a previous cycle memory means for recording a history of said regeneration enable signals for a certain number of last adsorption time intervals, and wherein said means for conditionally changing is responsive to the historical record in said previous cycle memory means.

25. The control system as claimed in claim 24, wherein said previous cycle memory means is a shift register.

26. The control system as claimed in claim 24, wherein said means for conditionally changing decreases the duration of said adsorption time interval in response to three consecutive regeneration enable signals being generated during three consecutive adsorption time intervals.

27. The control system as claimed in claim 26, wherein said means for conditionally changing increases the duration of said adsorption time interval in response to more than three consecutive adsorption time intervals occurring without said regeneration enable signals being generated.

28. The control system as claimed in claim 23, further comprising a selection interface passing a dew point select signal to said microcomputer, and wherein said means for limiting includes means for limiting the duration of said adsorption time interval to selected maximum and minimum values based upon said dew point select signal.

29. The control system as claimed in claim 28, wherein said means for conditionally changing includes means for changing the duration of said adsorption time interval by different predetermined amounts based upon said dew point select signal.

30. The control system as claimed in claim 29, wherein said select interface passes a dump valve select signal to said microcomputer.

31. The control system as claimed in claim 30, wherein said select interface passes to the microcomputer a signal for selecting dump valve timing.

32. The control program as claimed in claim 28, wherein said means for conditionally changing is inhibited by a fixed cycle select signal passed to said microcomputer through said selection interface.

* * * * *